United States Patent
Takayama et al.

(10) Patent No.: US 7,900,766 B2
(45) Date of Patent: Mar. 8, 2011

(54) CONVEYANCE DEVICE AND PACKING DEVICE PROVIDED THEREWITH

(75) Inventors: Motoki Takayama, Shiga (JP); Yuji Yokota, Shiga (JP); Kazuhiro Takaoka, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 178 days.

(21) Appl. No.: 12/373,795

(22) PCT Filed: Jul. 12, 2007

(86) PCT No.: PCT/JP2007/063909
§ 371 (c)(1),
(2), (4) Date: Jan. 14, 2009

(87) PCT Pub. No.: WO2008/007738
PCT Pub. Date: Jan. 17, 2008

(65) Prior Publication Data
US 2009/0283385 A1  Nov. 19, 2009

(30) Foreign Application Priority Data

Jul. 14, 2006 (JP) .................................. 2006-194322

(51) Int. Cl.
*B65G 47/26* (2006.01)
(52) U.S. Cl. ..................... 198/419.3; 198/426; 198/429; 198/418.7
(58) Field of Classification Search ............... 198/419.3, 198/418.7–419.2, 426, 429, 430
See application file for complete search history.

(56) References Cited

U.S. PATENT DOCUMENTS

| | | | | |
|---|---|---|---|---|
| 4,098,392 A | * | 7/1978 | Greene | 198/419.3 |
| 4,768,642 A | * | 9/1988 | Hunter | 198/419.2 |
| 5,012,628 A | | 5/1991 | Van Oord | |
| 6,953,113 B2 | * | 10/2005 | Iwasa et al. | 198/419.1 |

FOREIGN PATENT DOCUMENTS

| | | |
|---|---|---|
| JP | H02-191123 A | 7/1990 |
| JP | H08-183505 A | 7/1996 |
| JP | 2553999 B2 | 8/1996 |
| JP | 2004-217391 A | 8/2004 |

* cited by examiner

*Primary Examiner* — Mark A Deuble
(74) *Attorney, Agent, or Firm* — Global IP Counselors, LLP

(57) ABSTRACT

A conveyance device for accumulating and aligning a plurality of articles and conveying a batch of the articles includes a conveyance unit, first, second and third support members, and a drive unit. The conveyance unit is configured to convey the batch of the articles in a conveying direction. The first and second support members are configured to move along the conveyance unit so as to support an article disposed at a front end or a back end among the articles constituting the batch of the articles. The third support member is arranged on the conveyance unit and configured to move with respect to the conveyance unit so as to sandwich the batch of the articles between the third support member and at least one of the first support member and the second support member. The drive unit is configured to independently drive the first, second and third support members.

10 Claims, 18 Drawing Sheets

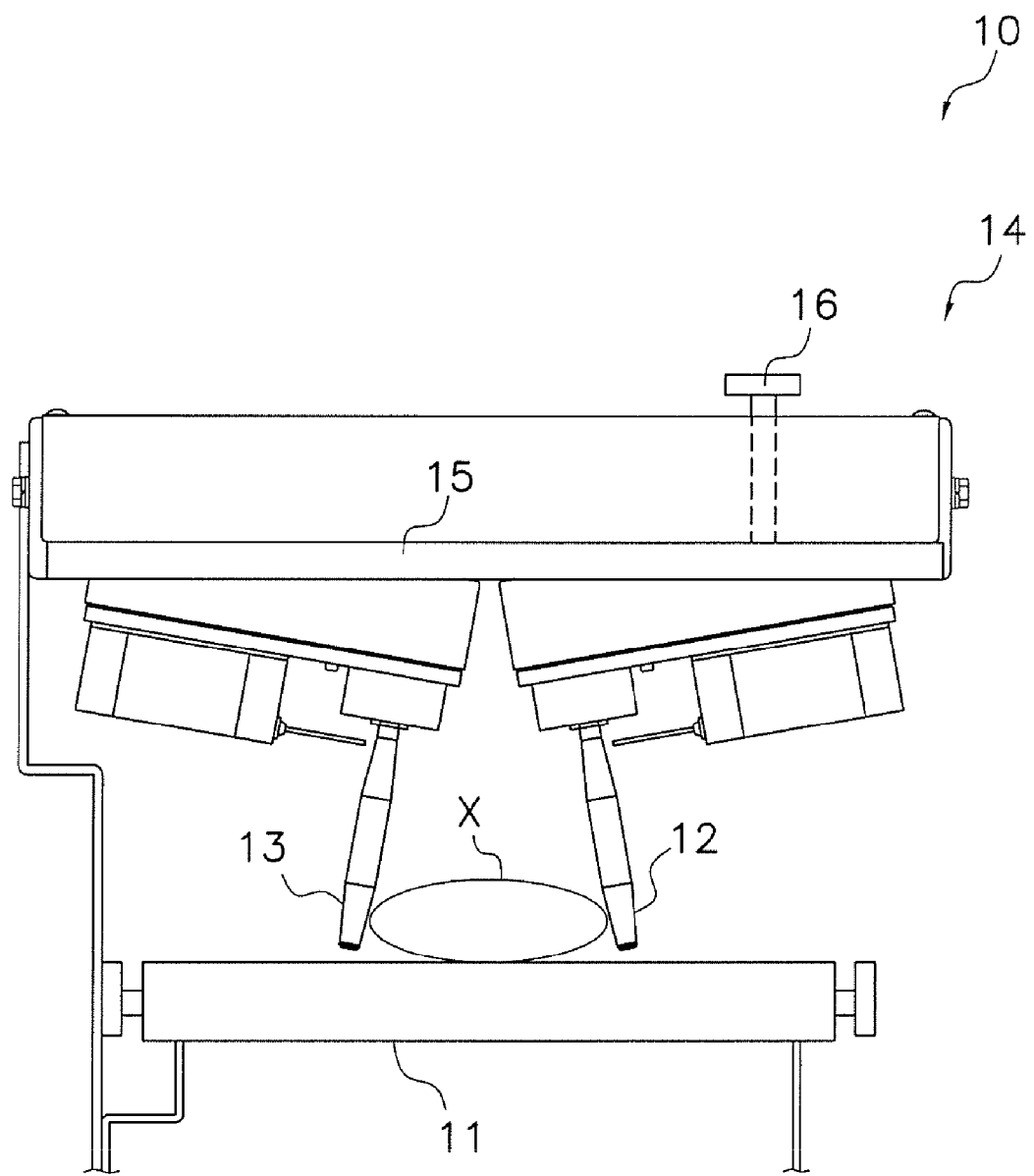
F I G. 3

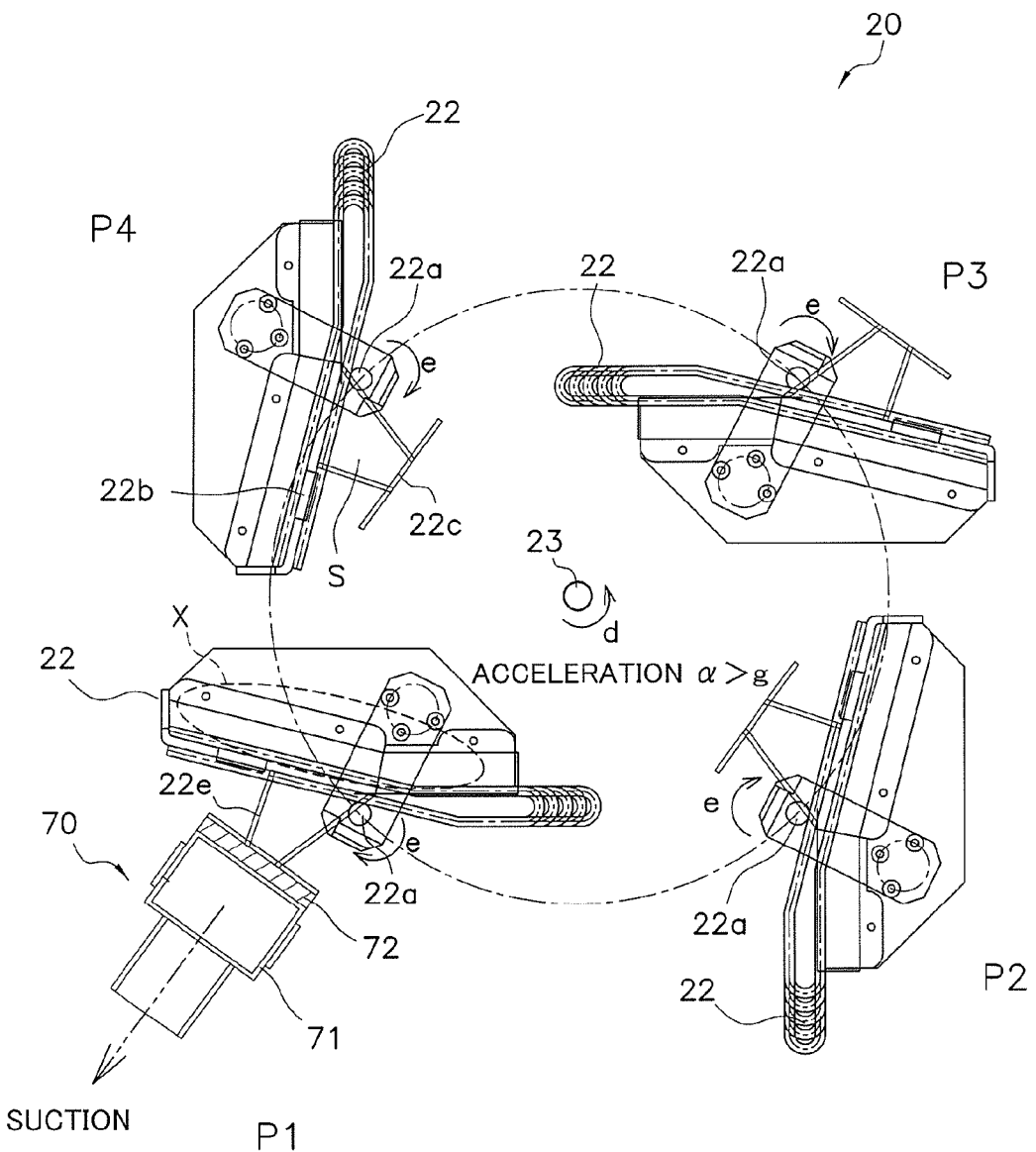
F I G. 4

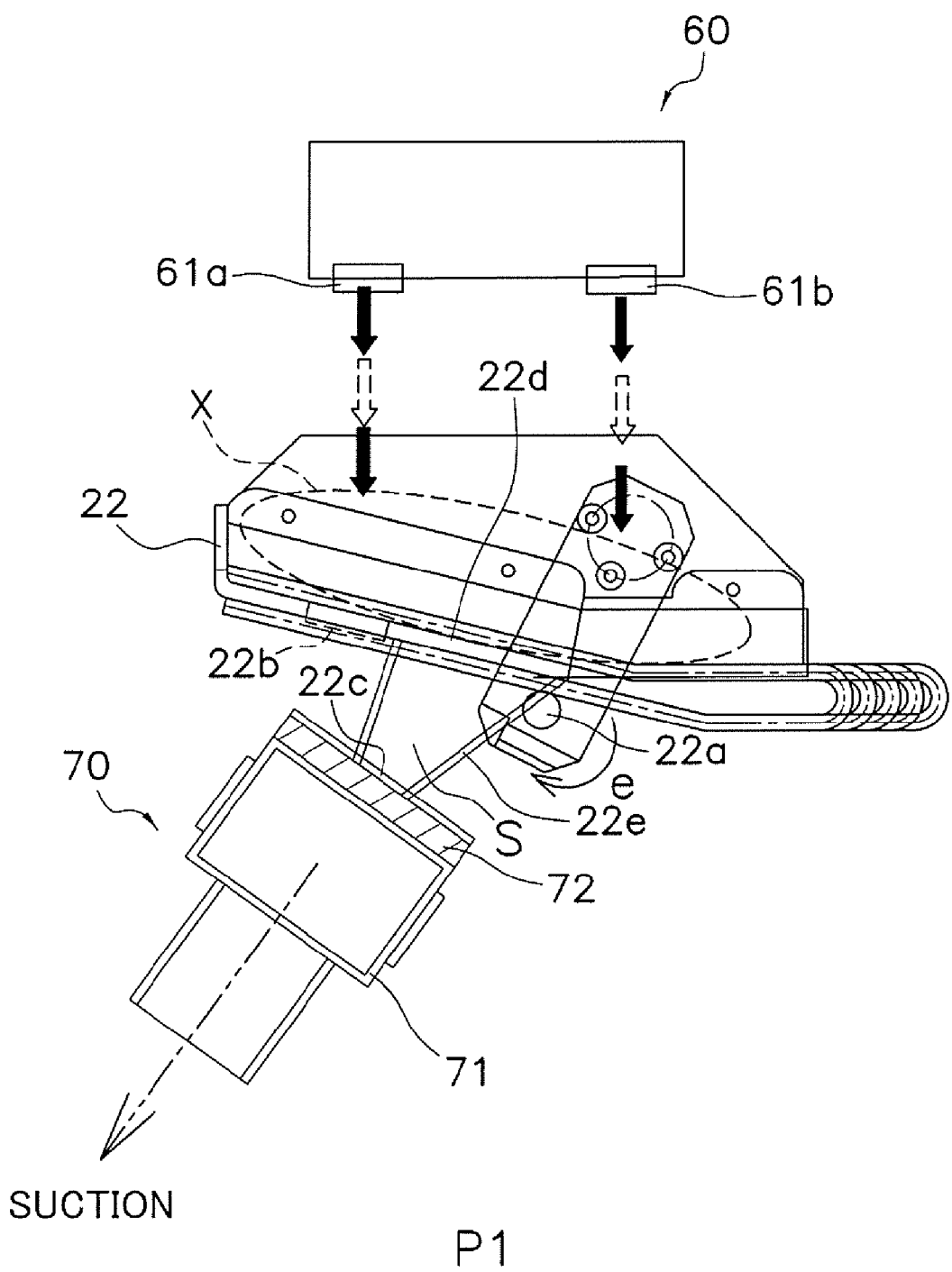
F I G. 5

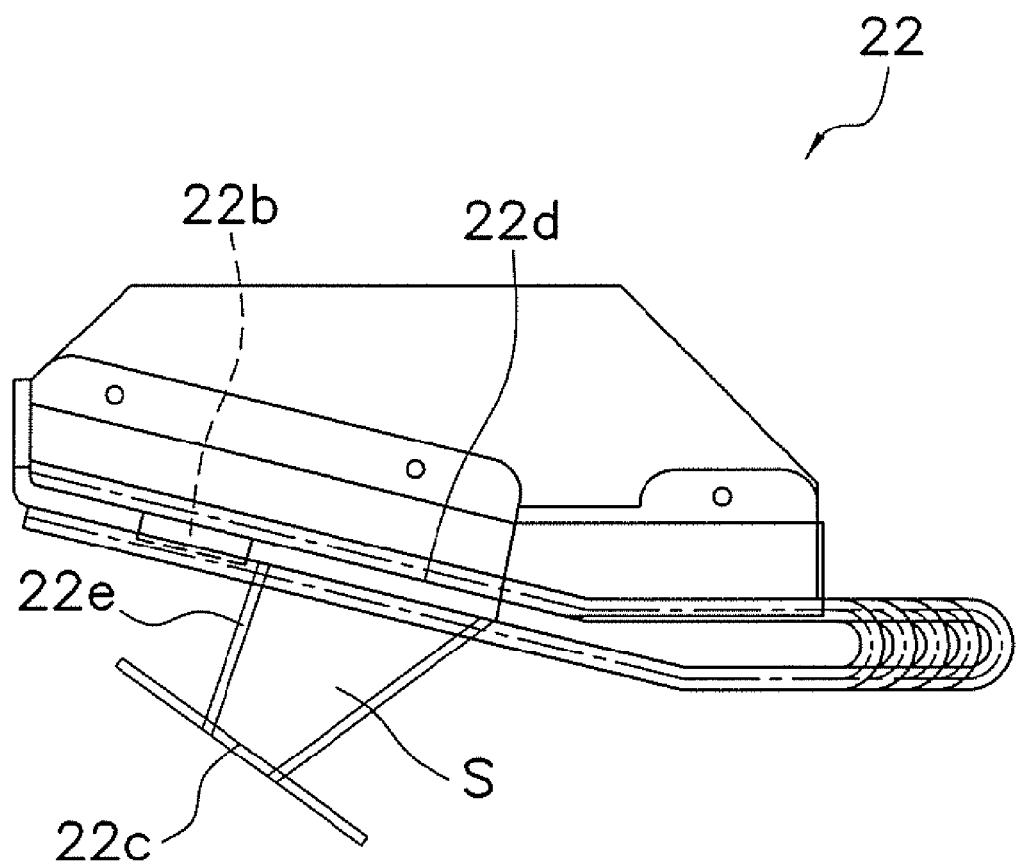
F I G. 6

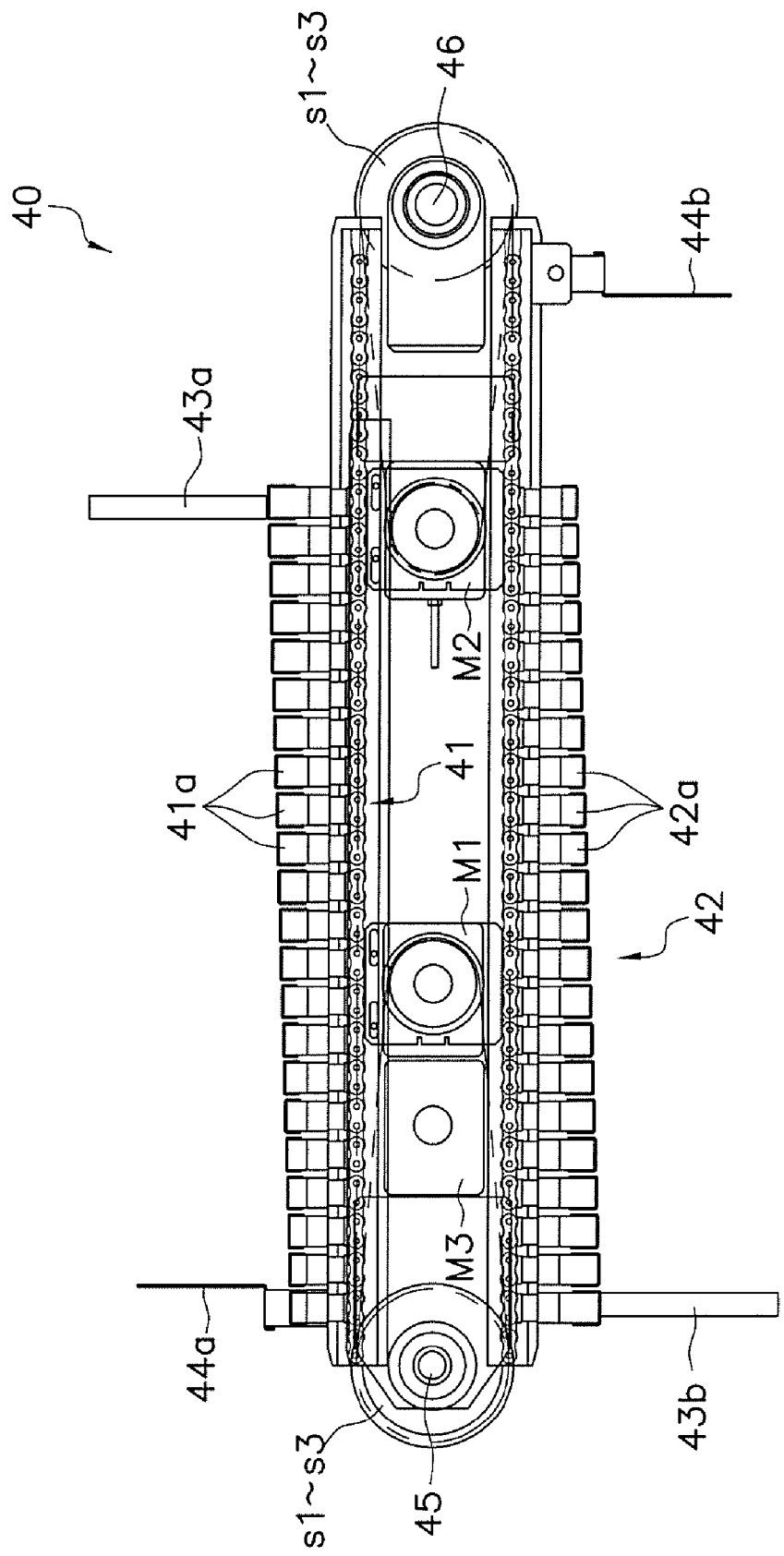
F I G. 8

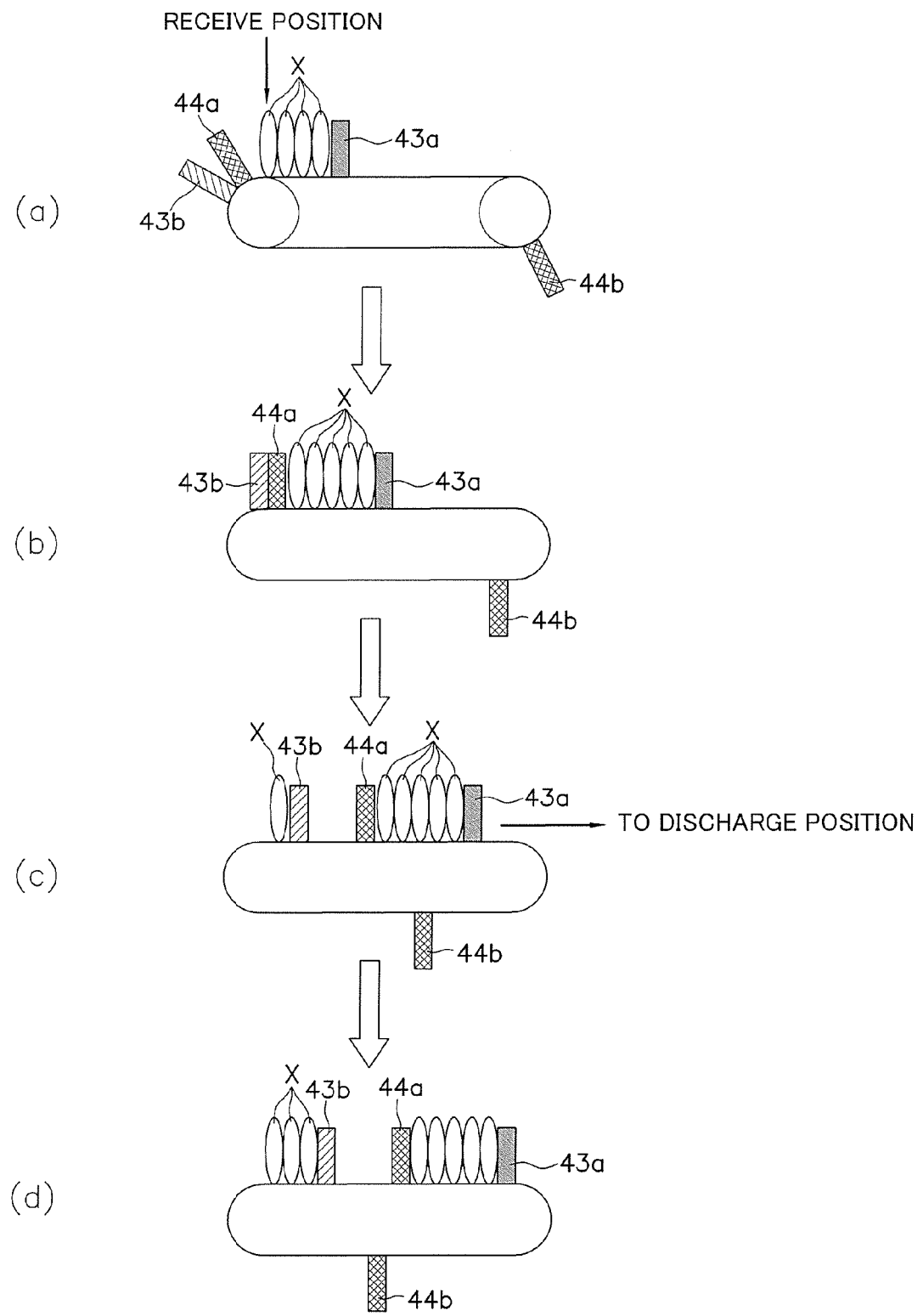
F I G. 9

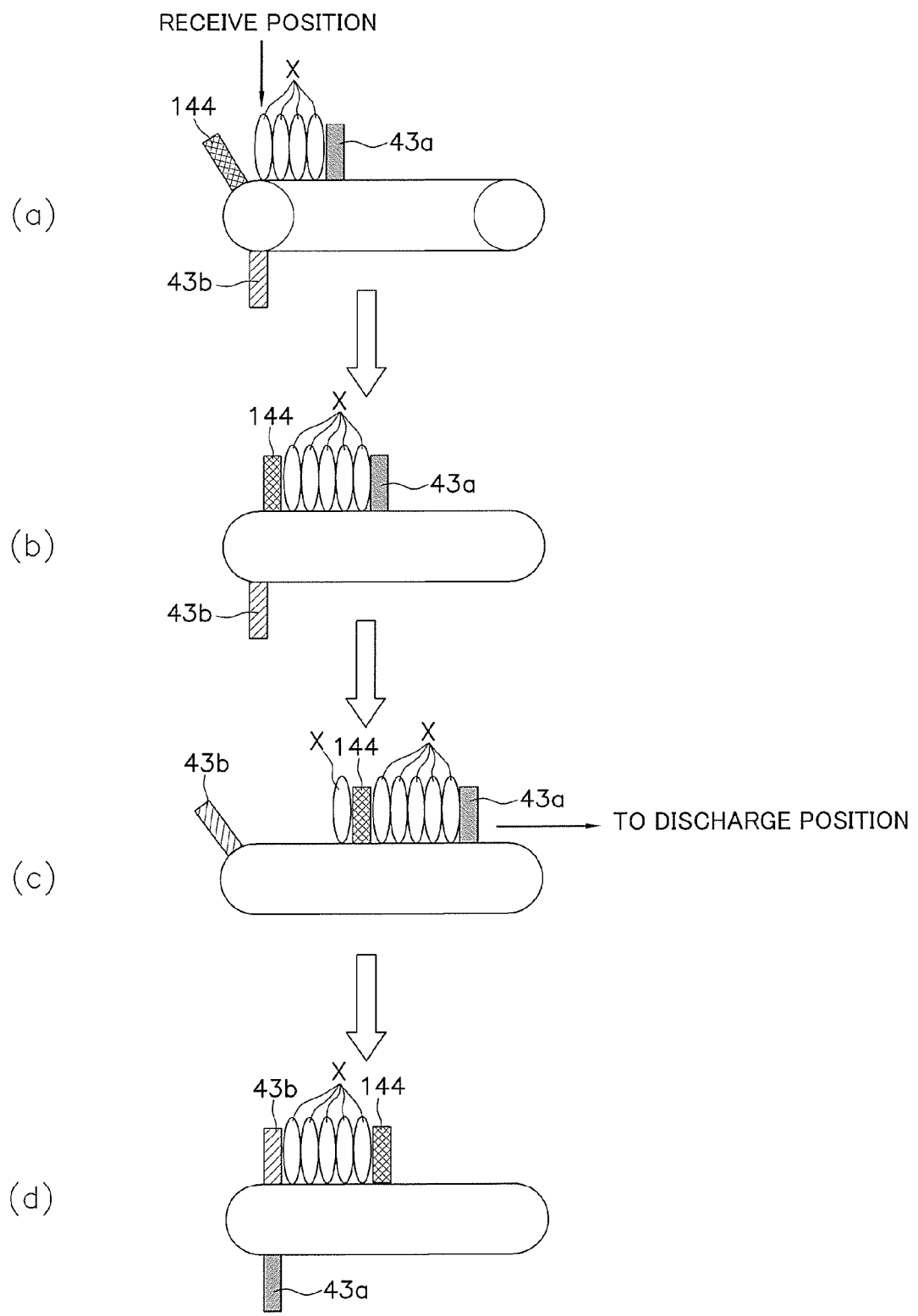
F I G. 17

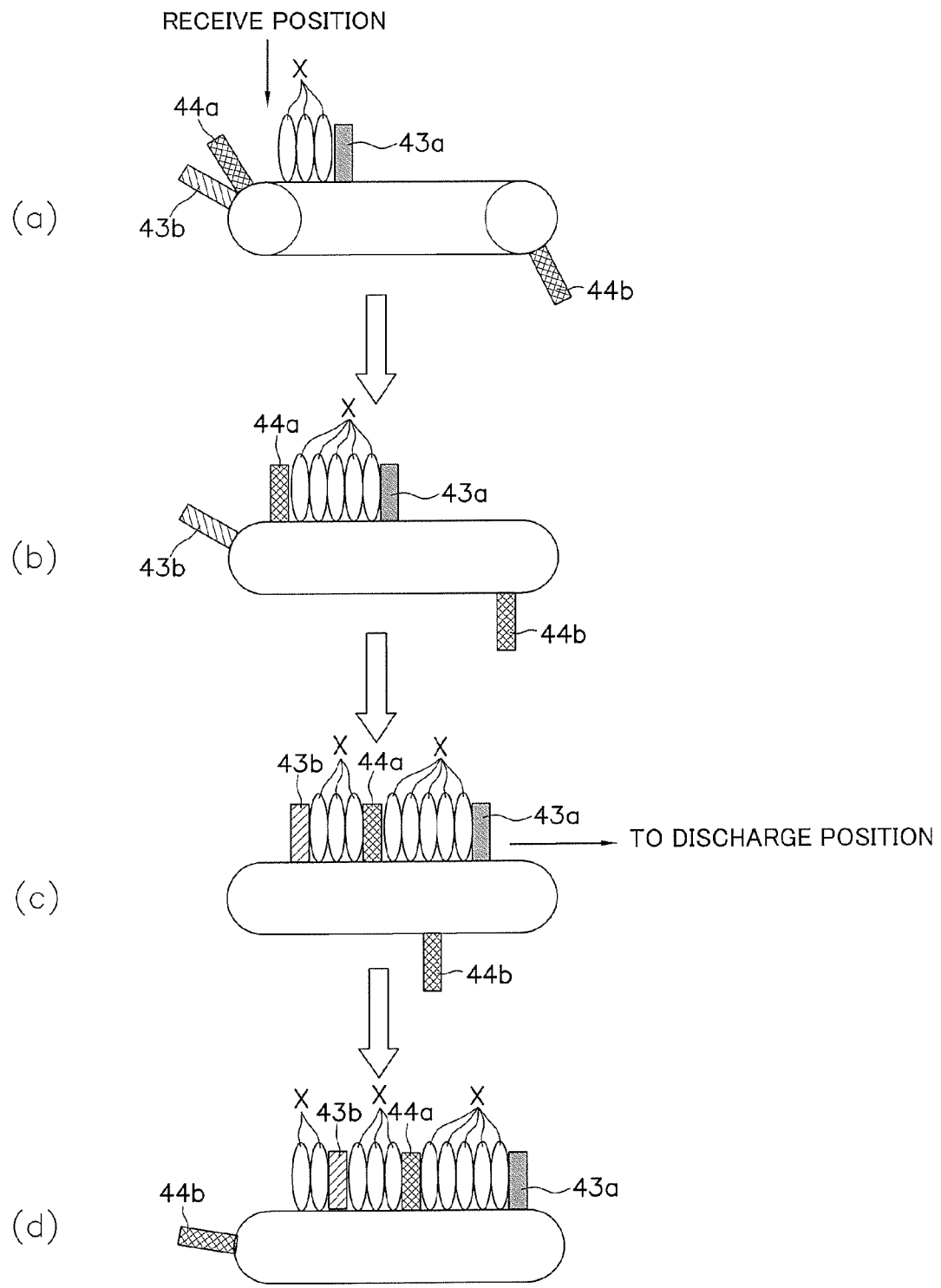
F I G. 1 8

CONVEYANCE DEVICE AND PACKING DEVICE PROVIDED THEREWITH

CROSS-REFERENCE TO RELATED APPLICATIONS

This national phase application claims priority to Japanese Patent Application No. 2006-194322 filed on Jul. 14, 2006. The entire disclosure of Japanese Patent Application No. 2006-194322 is hereby incorporated herein by reference.

TECHNICAL FIELD

The present invention relates to a conveyance device and a packing device provided therewith. More specifically, the present invention relates to a conveyance device mounted, for example, in a packing device, and configured to align and convey a plurality of articles received; and a packing device provided therewith.

BACKGROUND ART

Conventionally, an inspection device such as a seal checker for checking sealing failure of bags, a conveyance device for vertically arranging a plurality of conforming bags that have undergone inspection and then for packing these bags together into cardboard boxes, and the like are used in a production line including a combination weighing device and a bag manufacturing and packaging apparatus.

For example, Patent Publication No. 2553999 (registered on Aug. 22, 1996) discloses a conveyance device for sideshifting articles, which conveys a batch of a plurality of bags placed on a conveying surface in a sandwiched manner between a plurality of partition plates.

DISCLOSURE OF THE INVENTION

However, the conventional conveyance device described above has the following problems.

Specifically, with the conveyance device disclosed in the above described publication, after a plurality of articles to be packed in a box is received in the spaces between a plurality of partition plates, the partition plates are moved in a direction such that the spaces therebetween are narrowed while moving to a discharge position. Therefore, a batch of a plurality of bags is not quite stably conveyed when the partition plates are moved to narrow the spaces therebetween.

Therefore, it is an object of the present invention to provide a conveyance device which, when aligning and conveying a plurality of bags received, can stabilize the position of a batch of a plurality of bags, and a packing device provided therewith.

A conveyance device according to a first aspect of the present invention is a conveyance device that accumulates and aligns a plurality of articles carried in thereto and conveys a batch of the articles. The conveyance device includes a conveyance unit, first through third support members, and a drive unit. The conveyance unit is configured to convey the articles in a conveying direction. The first and second support members are configured to move along the conveyance unit so as to support an article disposed at a front end or a back end among the articles constituting the batch. The third support member is arranged on the conveyance unit and is configured to move with respect to the conveyance unit so as to sandwich the batch of the articles between the third support member and at least one of the first support member and the second support member. The drive unit is configured to independently drive the first through third support members.

Here, the conveyance device is disposed with the first support member and the second support member that support, for example, bag-shaped articles carried in lengthwise onto the conveyance unit; and the third support member that supports the batch of the articles carried in to be aligned on the conveyance unit such that the batch is sandwiched between the first or second support member and the third member. The conveyance unit conveys the batch of the articles in a predetermined conveying direction in a state in which the batch of the articles is held by the first through third support members.

Usually, with such a conveyance device that carries in a plurality of articles one by one, aligns a predetermined number of articles, and conveys these articles to a packing device and the like disposed downstream, the articles are accumulated in the standing position. This causes a problem that the balance of the batch of the articles is easily disturbed. Therefore, in order to stabilize the position of the articles during conveyance, a type of a conveyance device may be conceivable in which a conveying surface on which articles are accumulated is inclined downward in the conveyance direction. In this case, the direction of forces applied to the articles during conveyance can be limited to one direction; however, in case of conveyance at high speed, it is still difficult to achieve a stable conveyance simply in this way.

With the conveyance device of the first aspect of the present invention, a batch of a plurality of articles is supported in a sandwiched manner between the first support member or second support member and the third support member and conveyed, such that the position of the plurality of articles accumulated on the conveying surface is not disturbed.

Specifically, for example, the articles are carried into the rear of the first support member or the second support member, and when a predetermined number of articles are carried in, the rearmost article is supported from behind by the third support member. Alternatively, the articles are carried into the rear of the third support member, and when a predetermined number of articles are carried in, the rearmost article is supported from behind by the first or second support member. Further alternatively, the articles are carried into the rear of the first support member, and when a predetermined number of articles are carried in, the rearmost article is supported from behind by the second support member.

Accordingly, even when conveying at high speed in order to increase the processing ability of the downstream packing process and the like, a batch of the articles aligned on the conveying surface can be always stably conveyed in a predetermined conveying direction.

A conveyance device according to a second aspect of the present invention is the conveyance device according to the first aspect of the present invention, further including an additional third support member so that the third support member is provided, one for each of the first and second support members.

Here, the third support member that supports a batch of a plurality of articles between the first or second support member and the third member is provided, one for each of the first and second support members.

Accordingly, after a batch of a predetermined number of articles is aligned, for example, between the first support member and one of the third support members, the other third support member can be immediately moved to behind the second support member. Therefore, compared to a mechanism having only one third support member, a higher speed can be achieved without complicating the mechanism.

A conveyance device according to a third aspect of the present invention is the conveyance device according to the second aspect of the present invention, wherein the drive unit includes a drive source configured to move both of the third support members.

Here, the third support members are provided, one for each of the first and second support members, and these two third support members that are driven independently from the first and second support members are moved by the common drive source.

Accordingly, by disposing the two third support members diagonally in the conveyance unit, each of them can be moved to positions adjacent to the first and second support members. As a result, there is no need to independently drive these two third support members, and thus, it is possible to simplify the drive mechanism.

A conveyance device according to a fourth aspect of the present invention is the conveyance device according to any one of the first through third aspects of the present invention, wherein the conveyance unit has the conveying surface for aligning the articles, which is disposed along a generally horizontal direction.

Here, the conveyance unit is disposed such that the conveying surface for accumulating a batch of a plurality of articles in the conveyance unit is generally horizontal.

Usually, when the conveying surface of the conveyance unit is horizontal, the position of a batch of a plurality articles placed on the conveying surface is easily disturbed by the change in the conveyance speed and the like. In addition, when the conveying surface is inclined downward in order to stabilize the position of the articles, a box for putting an aligned batch of articles also needs to be disposed to be inclined, which may complicates the mechanism.

With the conveyance device of the fourth aspect, as described above, the rearmost article in the batch of a plurality of articles placed on the conveying surface of the conveyance unit is supported by the third support member.

Accordingly, even when the conveying surface is substantially horizontal, it is possible to stably convey a batch of articles in a predetermined direction without disturbing the position of the batch. Further, since the box for putting an aligned batch of articles can also be horizontally disposed, it is possible to prevent the downstream mechanism such as a packing device and the like from becoming complicated.

A conveyance device according to a fifth aspect of the present invention is the conveyance device according to any one of the first through third aspects of the present invention, wherein the conveyance unit has the conveying surface for aligning the articles, which is inclined downward toward the front in the conveying direction.

Here, the conveyance unit is disposed such that the conveying surface for accumulating a batch of a plurality of articles in the conveyance unit is inclined downward toward the front in the conveying direction.

Accordingly, by combining the above described third support members that each support the rearmost article in a batch of the articles placed on the conveying surface and the above described conveying surface that is inclined downward, forces applied to the aligned articles during conveyance can be concentrated in one direction. This enables a batch of a plurality of articles to be further stably conveyed by the conveyance unit.

A conveyance device according to a sixth aspect of the present invention is the conveyance device according to any one of the first through fifth aspects of the present invention, wherein at least one of the first support member and the second support member is configured such that the surface that comes into contact with the articles is inclined toward the front in the conveying direction of the conveyance unit.

Here, the first support member or the second support member for sandwiching a batch of a plurality of articles is configured such that a contact surface with the foremost article is inclined to the front in the conveying direction.

Accordingly, even when the conveying surface itself is generally horizontal, the foremost article that was the first to be carried onto the conveying surface can be supported in a slightly inclined state. Thus, the articles that are subsequently carried in can also be accumulated so as to be slightly inclined along the position of the foremost article. Therefore, when conveying the articles until a batch of a predetermined number of articles is obtained, the directions of forces applied to the articles are concentrated in one direction to convey the articles in a stable state. As a result, even during a high speed operation, the position of a batch of articles is not disturbed, and a stable conveyance can be achieved. Further, by combining the above described structure in which the conveying surface is inclined, a batch of the articles formed during conveyance can be conveyed in a more stable state.

A conveyance device according to a seventh aspect of the present invention is the conveyance device according to any one of the first through sixth aspects of the present invention, wherein the drive unit includes a plurality of drive sources configured to independently drive the first, second and third support members, the drive sources being respectively coupled to a plurality of sprockets that have the same diameter.

Here, the sprockets connected to the drive sources that respectively drive the first through third support members are configured to have the same diameter.

Accordingly, for example, when moving the first through third support members at the same speed, the control for rotation of each sprocket can bc simplified, particularly in area where the first through third support members move linearly and the area where they move in a circular arc.

A conveyance device according to an eighth aspect of the present intention is the conveyance device according to the first aspect of the present invention, wherein the conveyance device includes no additional third support member.

Accordingly, with a simple configuration in which the first and second support members are put together and the single third support member is added thereto, a batch of a desired number of bags can be supported between the first or second support member and the third support member, and conveyed to the downstream side.

A conveyance device according to a ninth aspect of the present invention is the conveyance device according to the first aspect of the present invention, wherein the first, second and third support members are arranged so that different numbers of bags are supported in a sandwiched manner between the first through third support members.

Here, the conveyance device is controlled such that batches of different numbers of bags such as eight bags, five bags, and the like are supported between the first through third support members.

Accordingly, it is possible to continuously supply batches of different numbers of bags instead of supplying batches of eight bags only, for example to the packing device and the like disposed downstream. As a result, by forming and supplying batches each having an appropriate number of bags according to the number of bags required by the packing device and the like disposed downstream, variation in control can be diversified.

A packing device according to a tenth aspect of the present invention comprises the conveyance device according to one of the first through ninth aspects of the present invention, and a push-in member that moves them batch of the articles aligned by the conveyance device into a box.

Here, in the packing device mounted with the above described conveyance device, for example, also when putting a batch of a plurality of articles aligned on the conveying surface into a box by the push-in member such as a pusher, the batch of a plurality of articles is supported in a sandwiched state between the first support member (second support member) and the third support member.

Accordingly, it is possible to stably feed a batch of the articles pushed toward the box by the push-in member into the box without disturbing the balance.

According to the conveyance device of the present invention, even when conveying at high speed in order to increase the processing ability of the downstream packing process and the like, a batch of a plurality articles aligned on the conveying surface can be always stably conveyed in a predetermined direction.

BRIEF DESCRIPTION OF THE DRAWINGS

FIG. 3 is a front elevational view showing a configuration of a conveyor unit included in the packing device in FIG. 1.

FIG. 4 is a front elevational view showing a configuration of a delivery mechanism included in the packing device in FIG. 1.

FIG. 5 is a front elevational view showing the positional relationship of a delivery table included in the delivery mechanism in FIG. 4, spray portions disposed at specific positions, and a suction device.

FIG. 6 is a front elevational view showing a configuration of the delivery table included in the delivery mechanism in FIG. 4.

FIG. 8 is a front elevational view showing the conveyance mechanism in FIG. 7.

FIG. 9 includes a series of schematic flow diagrams (a) to (d) showing a process in which products are aligned by the conveyance mechanism shown in FIGS. 7 and 8.

FIG. 17 includes a series of schematic flow diagrams (a) to (d) showing a process in which products are aligned by the conveyance mechanism according to yet another embodiment of the present invention.

FIG. 18 includes a series of schematic flow diagrams (a) to (d) showing a process in which products are aligned by the conveyance mechanism according to yet another embodiment of the present invention.

BEST MODE FOR CARRYING OUT THE INVENTION

A packing device 1 mounted with a conveyance device according to an embodiment of the present invention is described below with reference to FIGS. 1 to 14.

Overall Configuration of Packing Device 1

Figure 1:
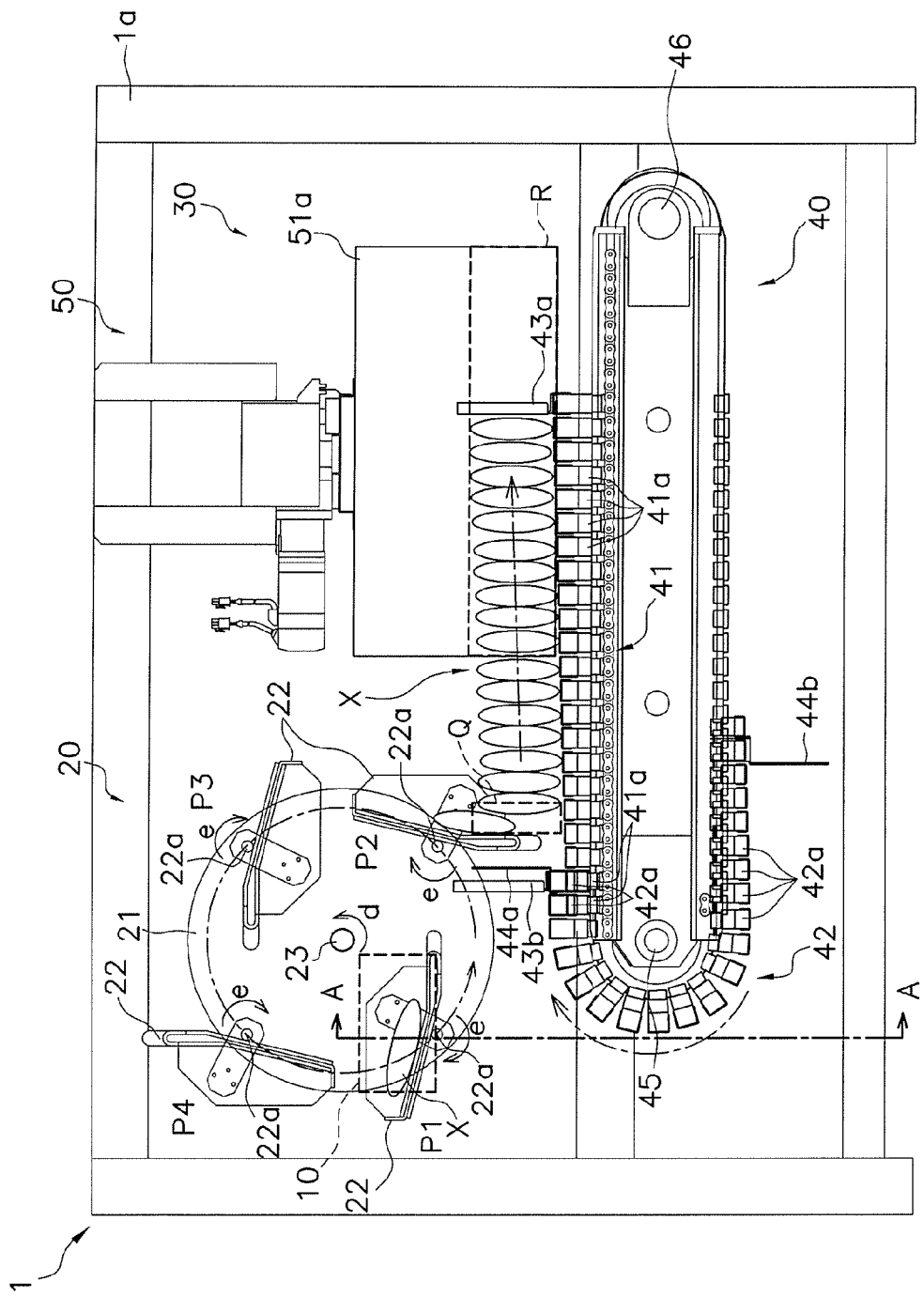
FIG. 1 is a front elevational view showing a configuration of a packing device according to an embodiment of the present invention.
Figure 2:
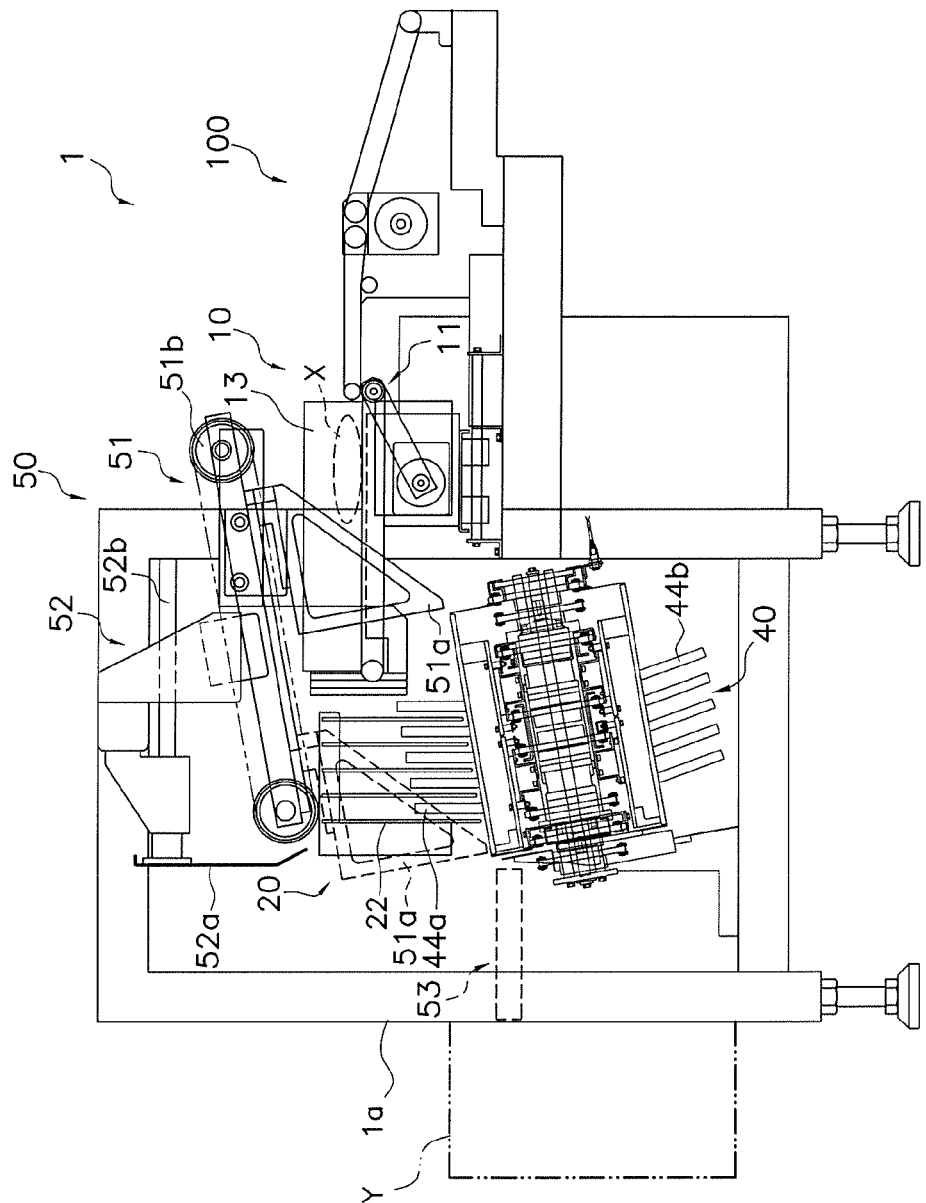
FIG. 2 is a side elevational view showing the packing device in FIG. 1.

As shown in FIGS. 1 and 2, the packing device 1 according to this embodiment is a device for conveying products (articles) X that are generally quadrilateral-shaped bags of snack foods obtained by packaging the snack foods in a soft packaging material and for packing the products X into a cardboard box Y. The packing device 1 includes a conveyor unit 10, a delivery mechanism 20, a packing mechanism 30 and a conveyance mechanism 40 (conveyance device).

Configuration of Conveyor Unit 10

Figure 10:
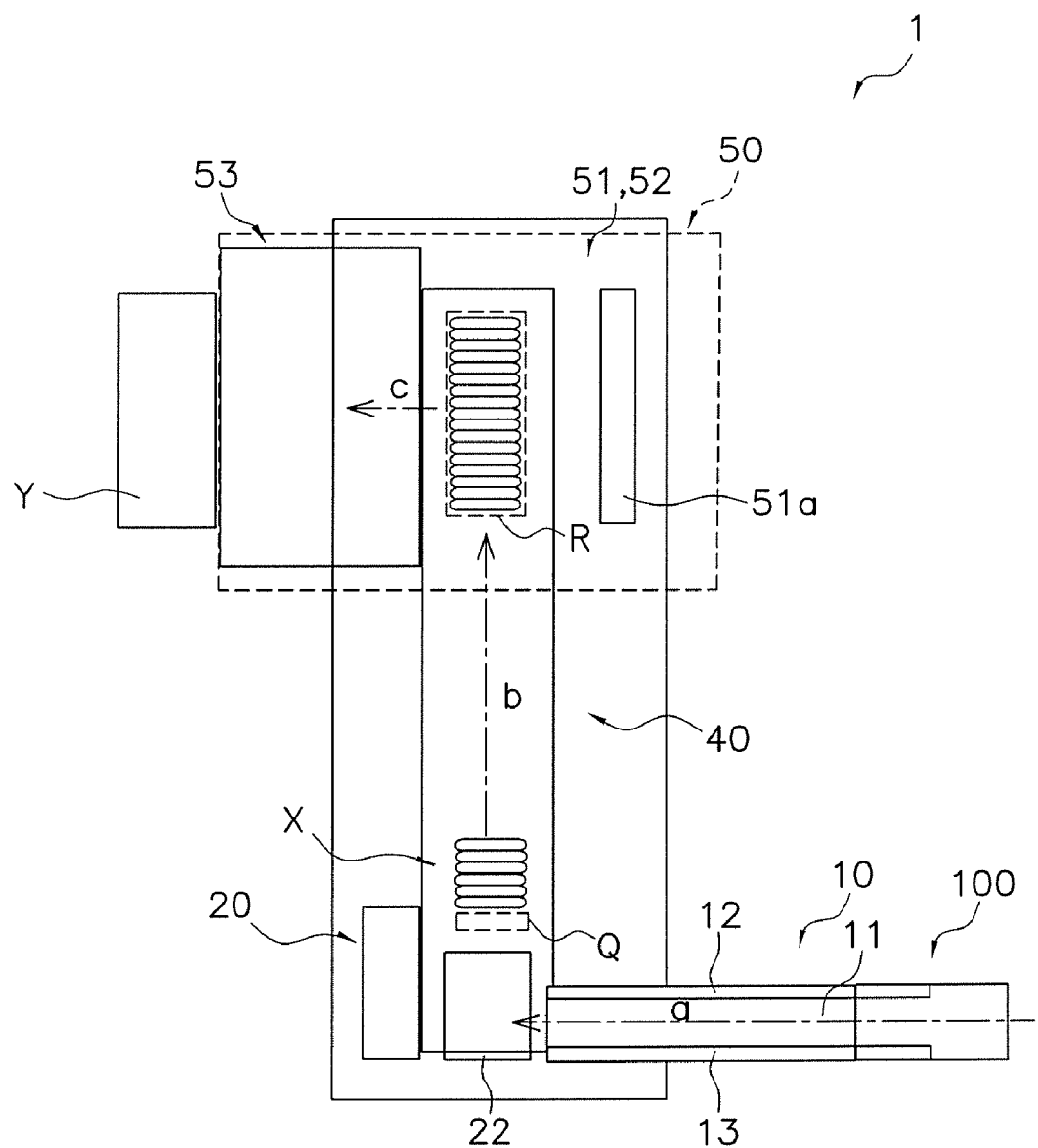
FIG. 10 is a schematic top plan view showing the movement of products in the packing device in FIG. 1.

The conveyor unit 10 is disposed on the upstream side in the packing device 1, and as shown in FIG. 2, sequentially conveys the products X conveyed from a conveyor 100 on the upstream side to the downstream side along a conveying direction A (see FIG. 10). As shown in FIG. 3, the conveyor unit 10 includes an intake conveyor 11, a pair of side conveyors 12 and 13, and an adjusting mechanism 14.

The intake conveyor 11 is disposed at the most upstream side in the packing device 1 and conveys the products X conveyed from the upstream side to the downstream side along the conveying direction A.

Here, the conveyance speed of the conveyor 100 is set to be slower than the conveyance speed of the intake conveyor 11. In addition, the conveying surface of the conveyor 100 on the upstream side has a smaller frictional resistance compared to the conveying surface of the intake conveyor 11, and the products X are conveyed on the conveying surface somewhat in a sliding manner.

As shown in FIG. 3, the pair of side conveyors 12 and 13 is disposed above the intake conveyor 11 so as to extend in a generally inverted V shape when viewed from the conveying direction A of the products X (see FIG. 10). Here, the side conveyors 12 and 13 are disposed such that the angle between each of their conveying surfaces and the conveying surface of the intake conveyor 11 is about 80 degrees.

In addition, the side conveyors 12 and 13 both come into contact with the products X at opposite sides of the conveying surface of the intake conveyor 11 in a direction intersecting the conveying direction A of the products X, and convey the products X at a predetermined speed in the conveying direction A to the downstream side. In addition, the pair of side conveyors 12 and 13 is set such that their conveyance speed is faster by about 5 m/min than that of the intake conveyor 11.

There is a case where the product X is conveyed from the upstream side in a state of being slightly more inclined to the conveying surface compared to the predetermined position. In such a case, one of the upstream end portions of the product X on the upstream side first comes into contact with the conveying surface of one of the side conveyors 12 and 13 when conveyed. Therefore, a force for moving the product X toward the center of the conveying surface of the intake conveyor 11 is generated. Accordingly, even when the product X is conveyed from the upstream side in a state of being slightly more rotated compared to the predetermined position, the conveyor unit 10 can bring the position of the product X back to the predetermined conveying position and convey to the downstream side.

Further, when the snack foods as the contents of the product X are unevenly distributed in the bag, since the pair of side conveyors 12 and 13 is in contact with the product X when conveying, it is possible to convey the product X while balancing the uneven distribution of the snack foods in the bag and achieving a more balanced state. This is another effect of the present invention.

The adjusting mechanism 14 is disposed at the upper portion of the conveyor unit 10, and adjusts an attachment position of the pair of side conveyors 12 and 13 in a direction intersecting the conveying direction A. In addition, the adjusting mechanism 14 includes a slide rail 15 and a positioning stopper 16.

The slide rail 15 is provided to a frame above the pair of side conveyors 12 and 13. The slide rail 15 adjusts the attachment position of the pair of side conveyors 12 and 13 in the direction intersecting the conveying direction A.

The positioning stopper 16 is provided in the vicinity of the slide rail 15, and fixes the position of the pair of side conveyors 12 and 13 attached to the slide rail 15.

Accordingly, with the conveyor unit 10, the attachment position of the pair of side conveyors 12 and 13 can be adjusted according to the size of the bag of the product X to be conveyed.

Configuration of Delivery Mechanism 20

The delivery mechanism 20 is disposed immediately on the downstream side of the conveyor unit 10. The delivery mechanism 20 receives the products X conveyed from the conveyor unit 10 on the upstream side to the downstream side along the conveying direction A and sequentially aligns the bags in the standing position at a predetermined position on the downstream side. Further, the delivery mechanism 20 includes a support plate 21, four delivery tables 22, a rotation axis 23, a spray portion 60 (see FIG. 5), and a suction device 70 (see FIG. 4).

As shown in FIG. 1, the support plate 21 is a generally circular plate rotatably supported by the rotation axis 23, and is attached to the lateral portion of a main body case 1a so as to be generally opposite to the conveying direction A on the downstream side of the conveyor unit 10.

The four delivery tables 22 are disposed on the same circle to the surface of the generally circular support plate 21, immediately on the downstream side of the conveyor unit 10. Each delivery table 22 has a placing surface 22d (see FIG. 5) having a comb-teeth shaped portion. Note that the detailed configuration and operation of the delivery tables 22 are described in a later section.

The rotation axis 23 is attached to the center portion of the generally circular support plate 21 and serves as the center of the rotational path of the four delivery tables 22. In addition, as shown in FIG. 4, the rotation axis 23 moves the four delivery tables 22 at the acceleration a that is greater than the acceleration of gravity g. Accordingly, the delivery tables 22 can be moved at high speed, and thus the processing ability of the packing device 1 can be improved.

As shown in FIG. 5, the spray portion 60 is disposed above a position P1 where the delivery tables 22 receive the products X from the conveyor unit 10. The spray portion 60 sprays air to the upper surface of each product X on the placing surface 22d of each delivery table 22. Note that the configuration of the spray portion 60 is described in detail in a later section.

As shown in FIGS. 4 and 5, the suction device 70 is disposed in the vicinity of the position P1 of the rotational path of the four delivery tables 22. The suction device 70 comes into contact with a second opening portion 22c (described later) of each delivery table 22 and sucks the product X placed on the delivery table 22. Note that the configuration of the suction device 70 is also described in detail in a later section.

Configuration of Delivery Table 22

As shown in FIGS. 4 to 6, each delivery table 22 includes a rotation axis 22a that rotatably supports each delivery table 22, a first opening portion 22b that opens on the placing surface 22d for placing the product X (excluding the comb-teeth shaped portion of the placing surface 22d), the second opening portion 22c that opens on the side opposite from the placing surface 22d for placing the product X, the placing surface 22d for placing the product X, and a chamber portion 22e for communicating the first and second opening portions 22b and 22c with each other.

The rotation axis 22a is a rotation axis for changing the position of the delivery table 22. Each rotation axis 22a is attached to the support plate 21. Further, by rotating around the rotation axis 22a, each delivery table 22 changes the position of the product X received from the conveyor unit 10 from the horizontal position to the standing position.

The first opening portion 22b comprises a plurality of circular holes formed on a metal plate portion (excluding the comb-teeth shaped portion) on the placing surface 22d for placing the product X of the delivery table 22. The first opening portion 22b sucks the product X onto the placing surface 22d by the negative pressure generated in an inside space S of the chamber portion 22e.

The second opening portion 22c comprises a plurality of circular holes formed at the leading end portion of the chamber portion 22e on the reverse side of each delivery table 22. When each delivery table 22 rotates around the rotation axis 22a while also moving along the rotational path around the rotation axis 23, the second opening portion 22c comes into contact with an elastic member 72 of the suction device 70 (described later) at the position P1. At this time, the suction device 70 with which the second opening portion 22c came into contact is sucking air by a vacuum pump (not shown). This can generate a negative pressure for sucking the product X placed on the delivery table 22 via the second opening portion 22c into the inside space S formed in the chamber portion 22e.

The placing surface 22d is a surface that comes into contact with the products X carried in from the conveyor unit 10, and includes the above described first opening portion 22b formed therein. In addition, as shown in FIG. 5 and other figures, the placing surface 22d is formed by two surfaces that mutually intersect so as to be closely contacted with the bag shape of the product X. Accordingly, by bringing the product X placed on the delivery table 22 into closer contact with the placing surface 22d, it is possible to effectively suck the product X by the first opening portion 22b.

The chamber portion 22e is provided to each delivery table 22 and disposed on the side opposite from the placing surface 22d for placing the product X. The chamber portion 22e is a box-shaped member for communicating the first opening portion 22b and the second opening portion 22c with each other, and forms the inside space S in the box. Further, in the chamber portion 22e, when the above described second opening portion 22c comes into contact with the suction device 70, the suction device 70 generates a negative pressure in the inside space S. In this embodiment, the product X placed on the delivery table 22 can be sucked via the first opening portion 22b by the negative pressure generated in the inside space S. In addition, the chamber portion 22e is configured such that the cross section of the inside space S is larger than the above described first and second opening portions 22b and 22c. In other words, each of the opening portions 22b and 22c is formed smaller than the cross section of the inside space S in the chamber portion 22e. Accordingly, even when each delivery table 22 rotates and moves away from the suction device 70, air flows into the chamber portion 22e from the second opening portion 22c, and thus the negative pressure generated by the suction device 70 at the position P1 where the products X are received is not easily eliminated. Consequently, it is possible to reduce the negative pressure to zero after some time lag. As a result, the suction force for holding the product X on each delivery table 22 can be maintained as long as possible.

Operation Of Delivery Tables 22

The delivery tables 22 rotationally move around the rotation axis 23 along with the rotation of the support plate 21. At the position P1 shown in FIG. 1, each delivery table 22 receives the product X conveyed from the conveyor unit 10 on the upstream side, in a state in which the longitudinal side of the product X is oriented generally horizontally. At this time, each product X received is held in a state of being sucked by the suction device 70 shown in FIG. 4 onto the placing surface 22d of the delivery table 22.

Subsequently, the support plate 21 rotates about 90 degrees around the rotation axis 23 in a rotational direction D. During this time, the delivery table 22 rotates only about 90 degrees around the rotation axis 22a in a rotational direction E such that the product X rises to the standing position, and the delivery table 22 moves to a position P2 shown in FIG. 1. Further, after placing the product X in the standing position at a predetermined position Q in a conveyance mechanism 40, the delivery table 22 moves away upward while rotating around the rotation axis 23 so as not to come into contact with the product X. At this time, one of buckets (conveyance units) 41 and 42 (described in detail in a later section) is waiting at the above described predetermined position Q to receive the products X in the standing position and align them.

Further, during the time when the support plate 21 rotates about 90 degrees around the rotation axis 23 in the rotational direction D from the position P2 shown in FIG. 1, the delivery table 22 rotates about 90 degrees around the rotation axis 22a in the rotational direction E and moves to a position P3 shown in FIG. 1. In the same manner, the delivery table 22 moves from the position P3 to a position P4.

The four delivery tables 22 disposed at the lateral portion of the support plate 21 sequentially perform the above described operation, and thereby a plurality of products X can be delivered to the predetermined position Q in the standing position and a batch of the products X can be formed.

Configuration of Spray Portion 60

As shown in FIG. 5, the spray portion 60 includes two spray outlets 61a and 61b. At the timing when each delivery table 22 receives the product X at the position P1 and starts moving to the position P2, the spray portion 60 intermittently sprays air to the upper surface of the product X from each of the spray outlets 61a and 61b.

Accordingly, the product X can be pressed against the placing surface 22d of each delivery table 22 by a wind pressure of the air sprayed from the spray portion 60. As a result, the delivery table 22 stably conveys each product X received from the conveyor unit 10 to the conveyance mechanism 40 on the downstream side, and can also change the position of the product X to the standing position.

In addition, in this embodiment, the spray portion 60 intermittently sprays air. Accordingly, comparing to the case where air is continuously sprayed, it is possible to avoid interference by the air with the movement of the product X to the delivery table 22 when the product X is carried therein from the conveyor unit 10.

Note that as for a position for spraying air, it suffices if air is sprayed only from the spray outlet 61b when pressing only the upstream side of the products X; whereas it suffices if air is sprayed only from the spray outlet 61a when pressing only the downstream side of the products X. Accordingly, it is possible to effectively prevent disturbance of the position of each product X, such as the standing up position, on the delivery table 22.

Configuration of Suction Device 70

As described above, the suction device 70 is a device for sucking the product X placed on each delivery table 22 onto the delivery table 22, and includes a main body 71 and the elastic member 72, as shown in FIGS. 4 and 5.

The main body 71 is connected to the vacuum pump via an air pipe (not shown), and a negative pressure is formed in the inside space by the vacuum pump.

The elastic member 72 has an opening substantially as large as the second opening portion 22c of each delivery table 22. As shown in FIGS. 4 and 5, the elastic member 72 is disposed generally parallel to the tangential direction of the rotational path of the delivery tables 22 so as to come into contact with the second opening portion 22c of each delivery table 22 at the position P1 where the delivery tables 22 receive the products X from the conveyor unit 10. The elastic member 72 functions as a buffer between the second opening portion 22c of each delivery table 22 and the suction device 70 when they come into contact with each other. Accordingly, it is possible to widen the allowable range of the positional accuracy between each delivery table 22 and the suction device 70 when they come into contact with each other, and it is also possible to extend the time to suck the inside of the chamber portion 22e of the delivery table 22 through contact via the elastic member 72. Note that rubber products and resin products such as urethane foam can be used as the elastic member 72.

Configuration of Packing Mechanism 30

As shown in FIG. 1, the packing mechanism 30 is disposed immediately on the downstream side of the delivery mechanism 20. At the predetermined position Q, the packing mechanism 30 receives a batch of a predetermined number of products X delivered in the standing position from the delivery mechanism 20 on the upstream side, and conveys the batch to a discharge position R along a conveying direction B (see FIG. 10). Further, as described above, each time a predetermined number of products X are conveyed to the discharge position R, the packing mechanism 30 discharges the batch of the products X in an accumulated state into a cardboard box Y (see FIGS. 2 and 10) set on the lateral side to the discharge position R and packs the batch therein. Further, the packing mechanism 30 includes the conveyance mechanism (conveyance device) 40 and a discharge device 50.

Configuration of Conveyance Mechanism 40

Figure 7:
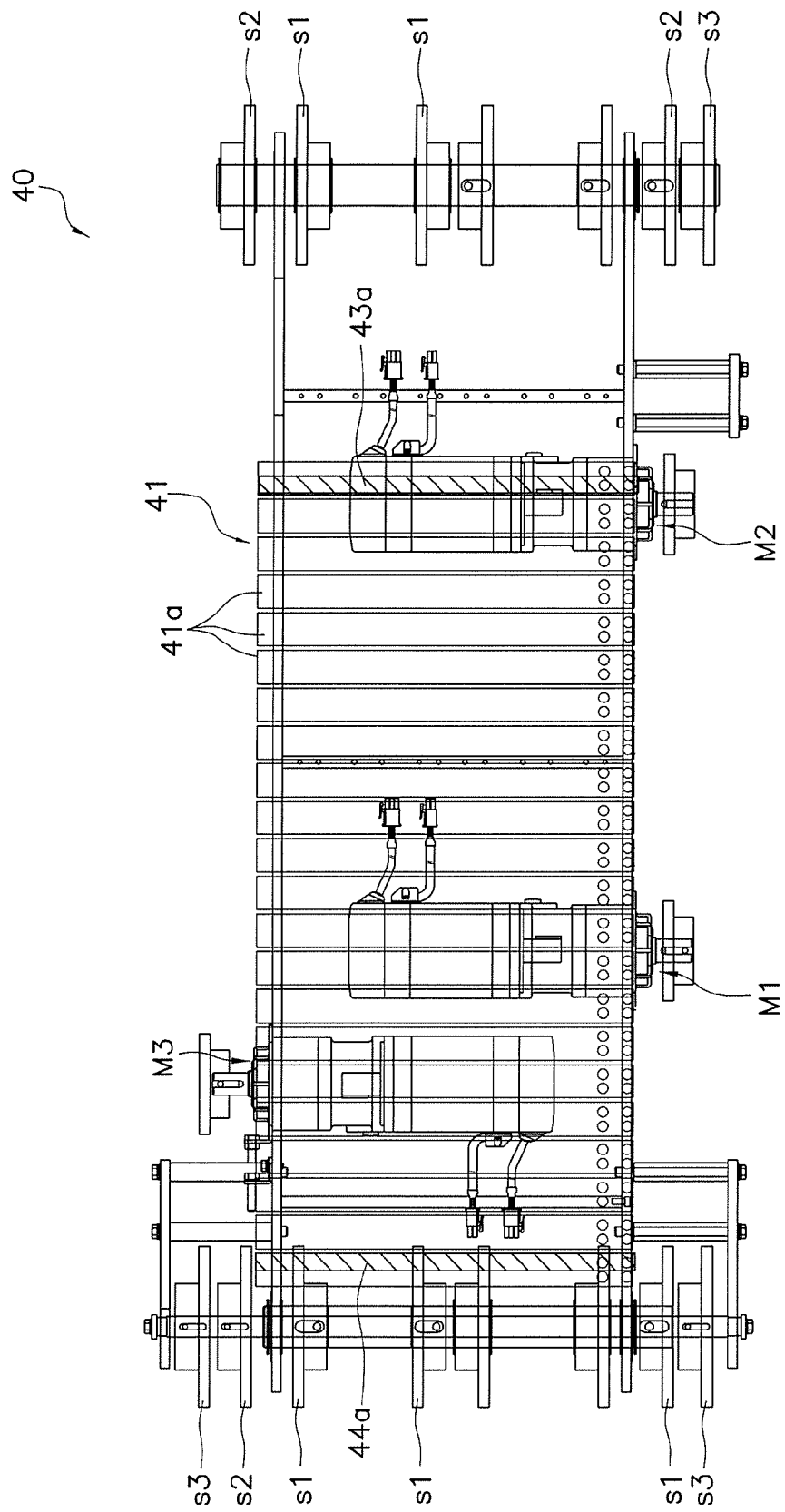
FIG. 7 is a top plan view showing a configuration of a conveyance mechanism included in the packing device in FIG. 1.

As shown in FIGS. 1, 7, and 8, the conveyance mechanism 40 includes the buckets 41 and 42, a partition plate (first support member) 43a, a partition plate (second support member) 43b, a pair of back plates (third support members) 44a and 44b, and three drive motors M1 to M3. The conveyance mechanism 40 sequentially receives the products X conveyed in the standing position from the delivery mechanism 20 on the upstream side to the predetermined position Q, and conveys a predetermined number of products X at a time to the discharge position R on the downstream side.

The buckets 41 and 42 are disposed respectively on the upstream side and the downstream side of the conveyance mechanism 40, and run in a loop along chains wound between sprockets s1 and s1 and between sprockets s2 and s2, which rotate around rotation axes 45 and 46. The buckets 41 and 42 convey a batch of a plurality of products X placed thereon from a predetermined position P on the upstream side to the discharge position R on the downstream side. In addition, each of the buckets 41 and 42 is formed by combining a plurality of base plates 41a or 42a.

The partition plates 43a and 43b are respectively attached to the base plates 41a and 42a disposed on the most downstream side (foremost side) among the plurality of the base plates 41a and 42a. With these partition plates 43a and 43b, the foremost article X in the batch of a plurality of products X delivered by the delivery tables 22 can be held in the standing position, and a plurality of products X to be subsequently delivered can be aligned on each of the buckets 41 and 42. In addition, the partition plates 43a and 43b are respectively independently driven by the drive motors M1 and M2 (described later) via the sprockets s1 and s2. Further, the partition plates 43a and 43b are configured such that the surfaces that come into contact with the product X are formed in a comb-teeth shape so as to intersect with the above described comb-teeth shaped portion of each delivery table 22 in order to prevent contact therebetween.

Back plates 44a and 44b are members that support from behind the batch of a plurality of products X placed on each of the buckets 41 and 42, and are provided, one for each of the partition plates 43a and 43b. In addition, the back plates 44a and 44b are driven by the drive motor M3 that is their common drive source, and are attached to mutually opposing positions in the moving loop. In this way, the back plates 44a and 44b are driven by the drive source different from the one for the partition plates 43a and 43b. Thereby, even when the number of the predetermined number of products X to be packed into the box changes, a batch of the products X can be sandwiched between the partition plates 43a and 43b, and this batch of the products X can be conveyed to the discharge position R in a stable state. Note that the back plates 44a and 44b are same as the partition plates 43a and 43b in that the back plates 44a and 44b are configured such that the surfaces that come into contact with the products X are formed in a comb-teeth shape so as to intersect with the above described comb-teeth shaped portion of each delivery table 22 in order to prevent contact therebetween.

Each of the sprockets s1 to s3 is disposed at both end portions of the conveyance mechanism 40 and they all have the same diameter. Accordingly, the partition plate 43a, the partition plate 43b, and the back plates 44a and 44b can be moved at the same RPM and same speed.

As described above, this embodiment is configured such that the partition plate 43a, the partition plate 43b, and the back plates 44a and 44b are independently driven: a first loop is formed by the drive motor M1 that drives the partition plate 43a, a second loop by the drive motor M2 that drives the partition plate 43b, and a third loop by the drive motor M3 that drives the back plates 44a and 44b.

Accordingly, by conveying a batch of a plurality of products X in a sandwiched manner between the partition plate 43a and the back plate 44a and another batch between the partition plate 43b and the back plate 44b, the conveyance mechanism 40 enables conveyance in a much more stable state than the conventional mechanism.

Here, a method of conveying a batch of the products X by the conveyance mechanism 40 is specifically described below taking the bucket 41 side as an example. Note that the other bucket 42 performs conveyance in the same manner as described below.

Specifically, when the products X are conveyed from the delivery tables 22 on the upstream side, the bucket 41 waiting at the predetermined position Q, where the products X are delivered, receives the foremost product X in the standing position by the partition plate 43a. Then, the bucket 41 moves to the downstream side by a predetermined distance corresponding to a thickness d1 of the bag of the product X (see FIG. 13). Thereby, as shown in FIG. 9(a), the bucket 41 receives a plurality of products X in an aligned state behind the product X that is received at the front. At this time, the back plate 44a is waiting on the downstream side of the predetermined position Q (see FIG. 10) for receiving the products X. The partition plate 43b for the bucket 42 on the downstream side is waiting immediately on the downstream side of the back plate 44a. Here, as shown in FIG. 9(b), when a batch of a predetermined number of products X is received, as shown in FIG. 9(c), the batch of a plurality of products X is sandwiched between the partition plate 43a and the back plate 44a. Then, in that state, as shown in FIG. 9(d), the batch is conveyed to the discharge position R (see FIG. 10) on the downstream side along the conveying direction B. At this time, as shown in FIG. 9(b), the partition plate 43b waiting immediately on the downstream side of the back plate 44a in the conveying direction B quickly moves to the downstream side of the back plate 44a and receives the products X for the next batch from the delivery tables 22.

In addition, as for the buckets 41 and 42, as shown in FIG. 1, the plurality of the base plates 41a and 42a are disposed such that the height increases from the upstream side to the downstream side. Therefore, for example, the foremost base plate 42a of the bucket 42 can overlap on the base plate 41a at the lowest position on the downstream side of the bucket 41. This can enable the bucket 42 to wait at a location closer to the predetermined position Q for receiving the products X from the delivery tables 22. Therefore, when a predetermined number of products X are placed on the bucket 41 and moved to the downstream side, the bucket 42 can quickly move to the predetermined position Q and receive the products X, thus enabling a high speed operation. Note that, the bucket 41 can also overlap in the same way on the base plate 42a on the downstream side of the bucket 42.

Configuration of Discharge Device 50

Figure 11:
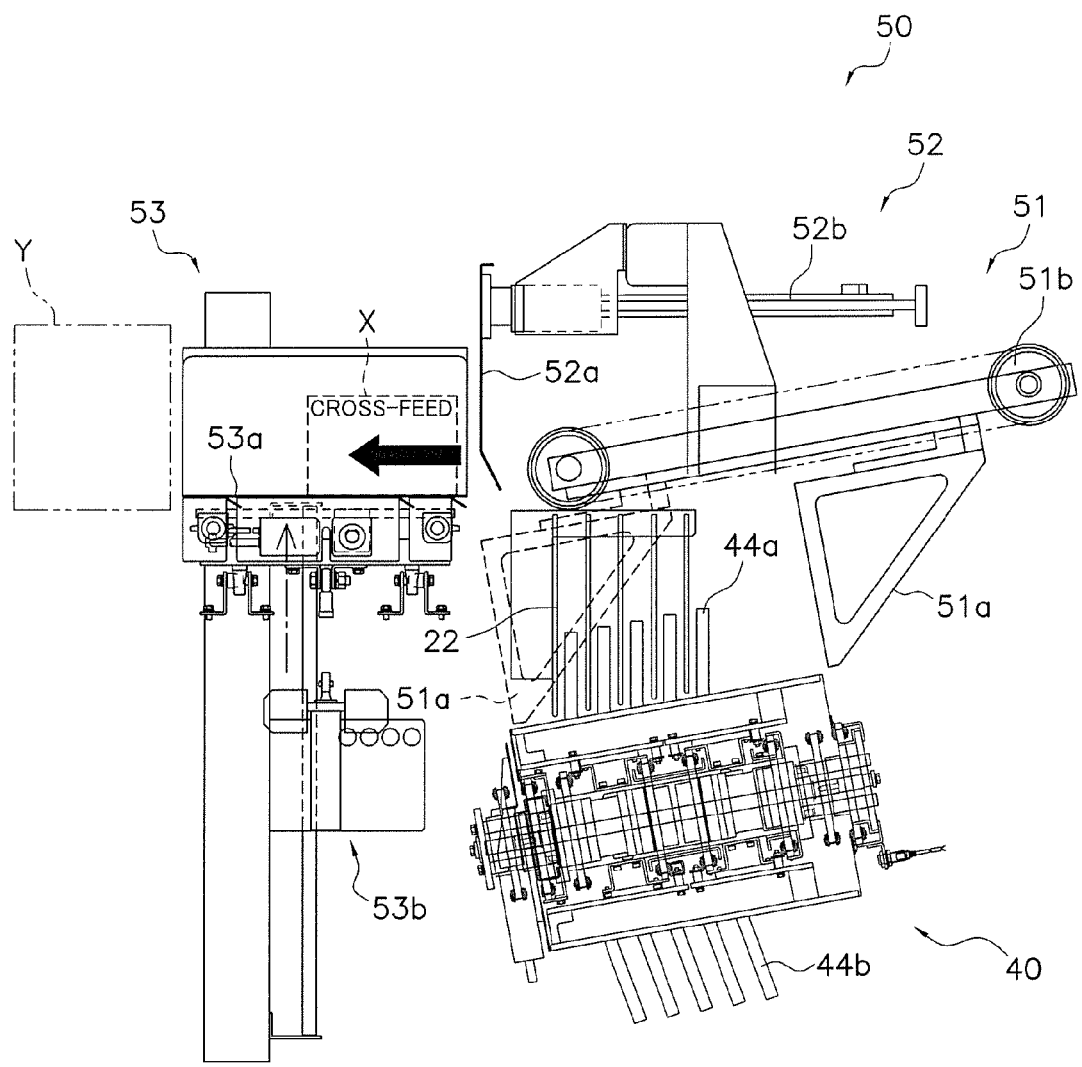
FIG. 11 is a side elevational view showing a configuration of a packing mechanism included in the packing mechanism in FIG. 1.

As shown in FIG. 10, the discharge device 50 is disposed immediately on the downstream side of the above described conveyance mechanism 40. The batch of the products X on each of the buckets 41 and 42, which is conveyed to the discharge position R and aligned in the standing position by the conveyance mechanism 40, is pushed by the discharge device 50 into the cardboard box Y (see FIGS. 2 and 10) by a cross-feed motion in two stages. In addition, as shown in FIG. 11, the discharge device 50 includes a first cross-feed mechanism 51, a second cross-feed mechanism 52, and a lifting mechanism 53.

The first cross-feed mechanism 51 cross-feeds the batch of the products X that is moved to the discharge position R by the above described conveyance mechanism 40, and conveys the batch onto the lifting mechanism 53. In addition, the first cross-feed mechanism 51 includes a pusher 51*a* that pushes the batch of the products X, and a moving mechanism 51*b* that reciprocates the pusher 51*a* within a predetermined range.

The pusher 51*a* is a plate shaped member that waits in the vicinity of the discharge position R in the conveyance mechanism 40. The pusher 51*a* pushes out the batches of the products X sequentially conveyed by the buckets 41 and 42 toward the conveying direction C (see FIG. 10) that is generally perpendicular to the conveying direction B, and moves each batch of the products X onto a conveying surface 53*a* of the lifting mechanism 53.

The moving mechanism 51*b* supports the pusher 51*a* from above, and drives the pusher 51*a* so as to move the batch of the products X onto the lifting mechanism 53 from the conveyance mechanism 40.

The second cross-feed mechanism 52 is disposed on the upper stage of the first cross-feed mechanism 51. The batch of the products X lifted up by the lifting mechanism 53 (described later) is pushed by the second cross-feed mechanism 52 from the conveying surface 53*a* of the lifting mechanism 53 into the cardboard box Y and packed therein. In addition, the second cross-feed mechanism 52 includes a pusher (push-in member) 52*a* and an electric cylinder 52*b*.

Figure 12:
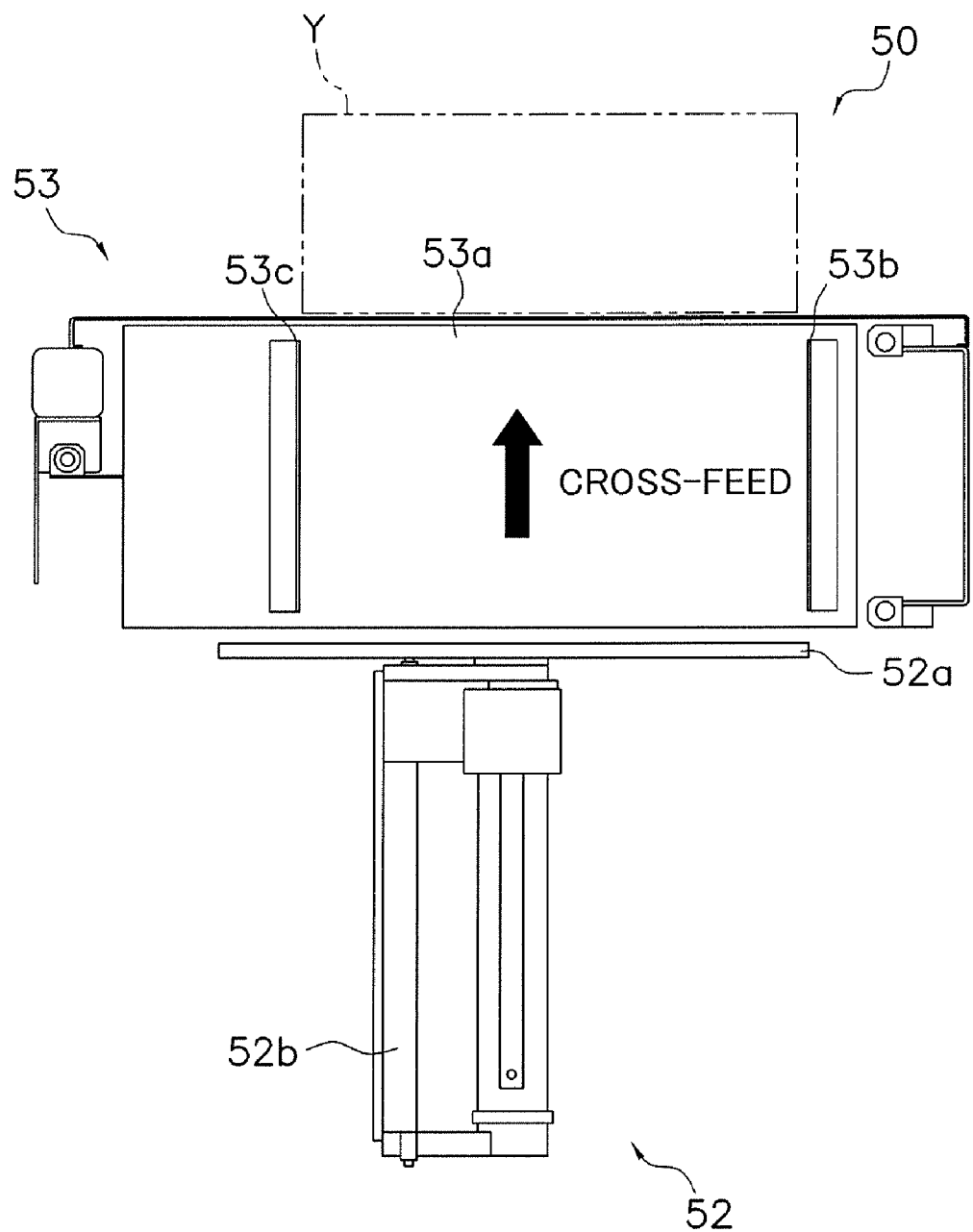
FIG. 12 is a top plan view showing a configuration of a discharge device included in the packing device in FIG. 11.
Figure 13:
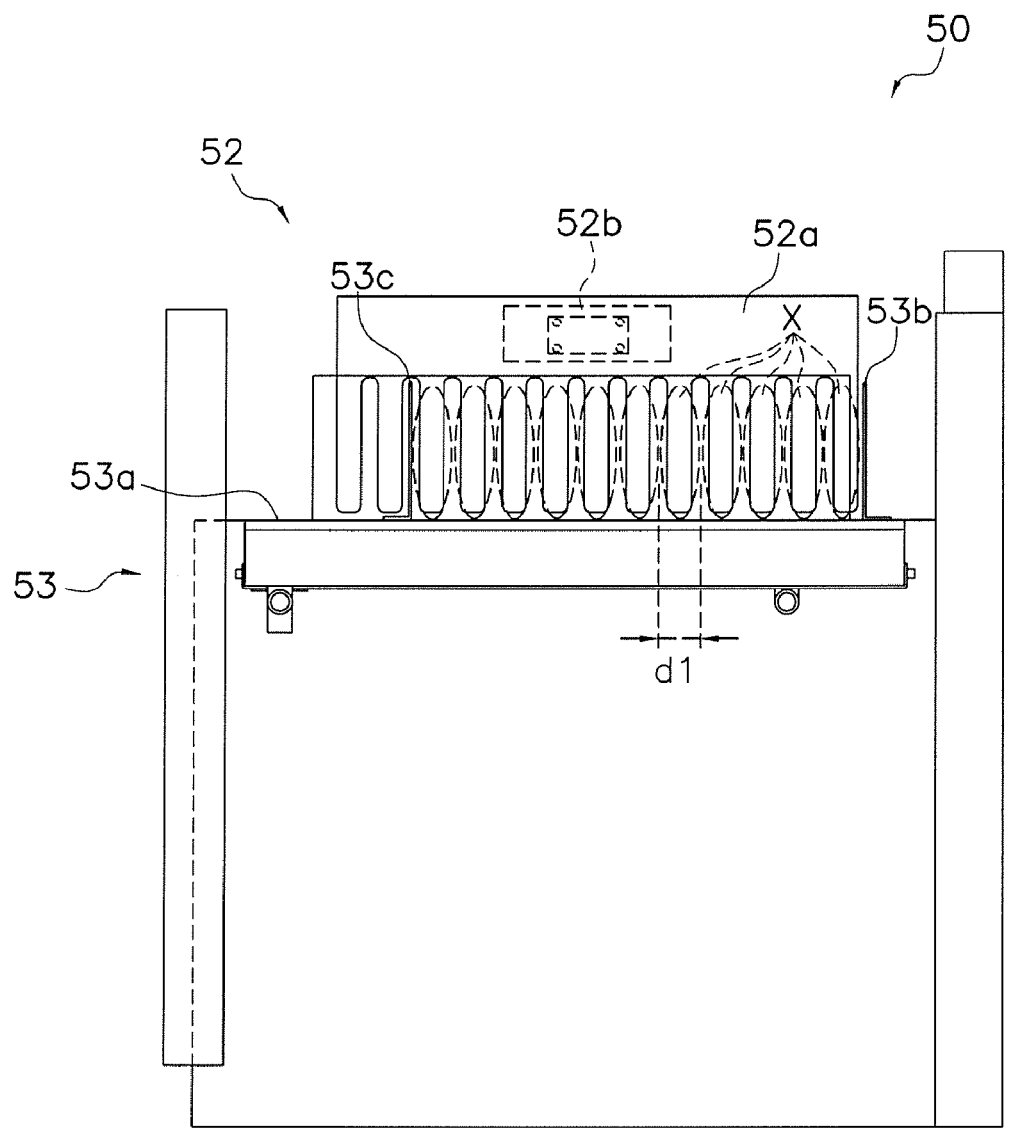
FIG. 13 is a rear elevational view showing a configuration of the discharge device in FIG. 12.
Figure 14:
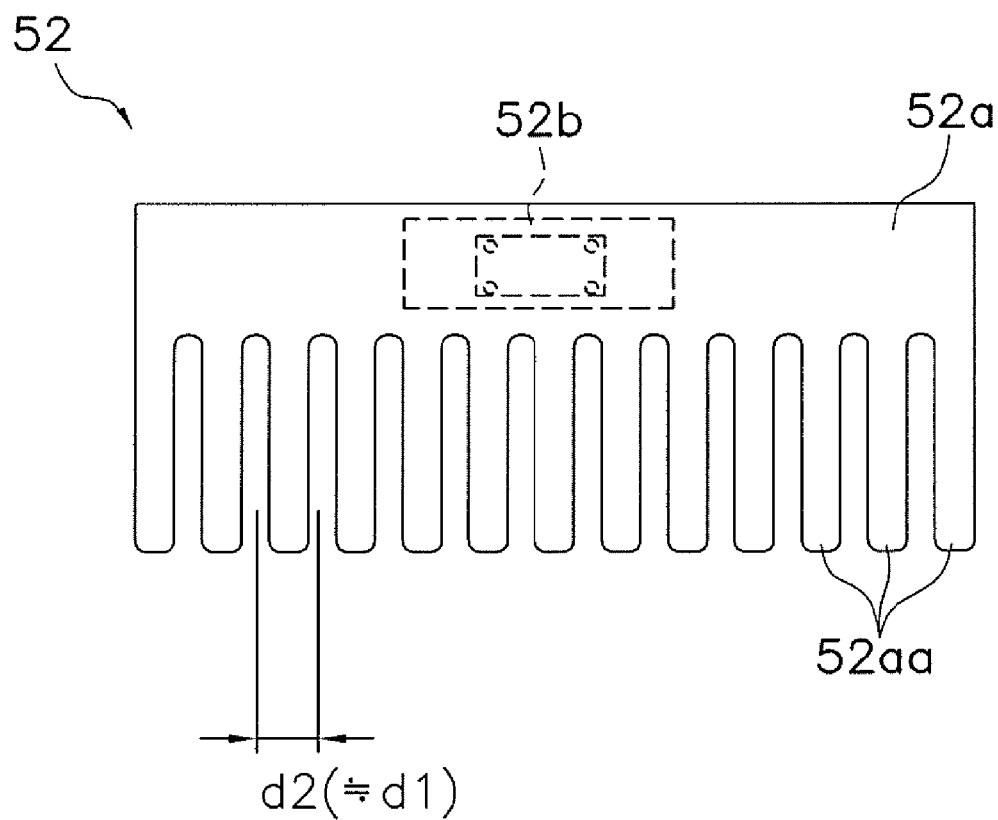
FIG. 14 is an elevational view showing a configuration of a pusher included in the discharge device in FIGS. 12 and 13.

As shown in FIGS. 11 and 12, the pusher 52*a* waits at a position opposite from the cardboard box Y so as to sandwich the lifting mechanism 53 between the pusher 52*a* and the cardboard box Y into which the batch of the products X is packed. As shown in FIGS. 13 and 14, the pusher 52*a* is a plate member having a comb tooth-shaped portion 52*aa*, and is disposed such that the comb tooth-shaped portion 52*aa* faces downward. As shown in FIGS. 12 and 13, the comb tooth-shaped portion 52*aa* moves such that support members 53*b* and 53*c* attached on the conveying surface 53*a* of the lifting mechanism 53 (described later) are inserted into the spaces of the comb tooth-shaped portion 52*aa*.

The electric cylinder 52*b* is disposed on the back of the pusher 52*a* (on the opposite side from the contact surface with the products X), and pushes the batch of a plurality of products X that is moved upward by the lifting mechanism 53 into the cardboard box Y by the pusher 52*a* and packs the batch therein.

As shown in FIG. 11, the batch of a plurality of products X cross-fed from the conveyance mechanism 40 by the first cross-feed mechanism 51 is moved by the lifting mechanism 53 in a generally vertical direction to a height where it is possible for the second cross-feed mechanism 52 to cross-feed. As shown in FIGS. 12 and 13, the lifting mechanism 53 includes the conveying surface 53*a* and the support members 53*b* and 53*c*.

The conveying surface 53*a* is a flat surface that expands in a generally horizontal direction, and is located on the upper surface of the lifting mechanism 53.

The support member 53*b* is a metal plate member formed in a generally L-shape, and is disposed on the most downstream side in a direction parallel to the conveying direction B (see FIG. 10) on the conveying surface 53*a*, in order to prevent falling of the product X at the foremost position among the plurality of products X carried onto the conveying surface 53*a* by the first cross-feed mechanism 51.

The support member 53*c* is also a metal plate member formed in a generally L-shape, and is disposed on the most upstream side in a direction parallel to the conveying direction B (see FIG. 10) on the conveying surface 53*a*, in order to prevent falling of the product X at the rearmost position among the plurality of products X carried onto the conveying surface 53*a* by the first cross-feed mechanism 51.

Note that the distance between the support member 53*b* and the support member 53*c* can be varied by changing the position of the support member 53*c* according to the size of the cardboard box Y.

Here, the batch of the products X that is moved upward by the lifting mechanism 53 is supported from the both sides by the support members 53*b* and 53*c* on the conveying surface 53*a*. Therefore, when moving the batch of the products X from the conveying surface 53*a* of the lifting mechanism 53 into the cardboard box Y, if the pusher 52*a* of the second cross-feed mechanism 52 is moved forward from the waiting position, the pusher 52*a* and the support members 53*b* and 53*c* could interfere with each other. However, in this embodiment, as described above, the pusher 52*a* of the second cross-feed mechanism 52 is formed in a comb-teeth shape. Further, as shown in FIG. 14, a distance d2 of the spaces of the comb tooth-shaped portion 52*aa* is configured to be equal to the thickness d1 of the bag of the product X. Accordingly, even when the pusher 52*a* of the second cross-feed mechanism 52 is moved forward from the waiting position, the mutual interference can be avoided, and the batch of the products X can be easily packed into the cardboard box Y. Further, even the number of the products X contained in the batch to be packed into the box is changed, since the distance d2 of the spaces of the comb tooth-shaped portion 52*aa* is equal to the thickness d1 of the bag of the product X, it is possible to avoid mutual interference without replacing the pusher 52*a* and easily pack the batch of the products X into the cardboard box Y.

With the packing device 1 in this embodiment, in the manner as described above, the batch of the products X can be smoothly and stably conveyed in the standing position in a predetermined direction from the delivery mechanism 20 via the packing mechanism 30, and packed into the cardboard box Y. Thus, it is possible to significantly improve the efficiency of the packing process by the packing device 1.

(1) With the packing device 1 in this embodiment, as shown in FIGS. 8 and 9(*a*) to 9(*d*), when conveying a plurality of products X placed on the buckets 41 and 42 in a predetermined direction, a batch of the products X on the bucket 41 side is sandwiched between the partition plate 43*a* and the back plate 44*a* each independently driven, and another batch on the bucket 42 side is sandwiched between the partition plate 43*b* and the back plate 44*b* each independently driven as they are conveyed.

Accordingly, even when conveying a plurality of bagged products X in the standing position on the buckets 41 and 42, the batches of the products X can be supported from the front and back by the partition plates 43*a* and 43*b* and the back plates 44*a* and 44*b* and conveyed. As a result, the batches of the products X can be always held in a stable state and conveyed in a predetermined direction, regardless of the number of the products X to be packed into the box, i.e., the number of the products X placed on the buckets 41 and 42.

(2) With the packing device 1 in this embodiment, as shown in FIG. 8 and other figures, the buckets 41 and 42 respectively including the partition plates 43a and 43b are provided with the back plates 44a and 44b, one for each, respectively.

Accordingly, immediately after a batch of the products X is conveyed by the bucket 41 by using the partition plate 43a and the back plate 44a, the bucket 42 can align the next batch of the products X by moving the partition plate 44a and the back plate 44b to the predetermined position Q. As a result, it is possible to accelerate the conveying process by the conveyance mechanism 40 and improve the process efficiency.

(3) With the packing device 1 in this embodiment, as shown in FIGS. 7 and 8, the back plates 44a and 44b are driven by the drive motor M3 that is their common drive source.

Accordingly, by disposing the back plates 44a and 44b at the mutually opposing positions in the loop formed by a chain wound around the sprockets s3 and s3, it is possible to convey batches of the products X in a sandwiched manner between the spaces formed by the partition plates 43a and 43b and the back plates 44a and 44b. Further, by driving the two back plates 44a and 44b by the common drive source, it is possible to simplify the drive mechanism.

(4) With the packing device 1 in this embodiment, as shown in FIGS. 7 and 8, the sprockets s1 to s3 rotationally driven by the drive motors M1 to M3 that drive the partition plates 43a and 43b and the back plates 44a and 44b are all configured to have the same diameter.

Accordingly, in the area where the partition plates 43a and 43b and the back plates 44a and 44b are moved linearly and the area where they are moved in a circular arc, they can be moved at the same speed by a simple drive control.

Other Embodiments

While only one embodiment of the present invention has been described, the scope of the invention is not limited to the above described embodiment, and various changes and modifications can be made herein without departing from the scope of the invention.

(A) The above embodiment is described with an example in which the back plates 44a and 44b as the third support members are provided, one for each of the partition plates 43a and 43b as the first and second support members. However, the present invention is not limited thereto.

For example, only one third support member may be provided such that the third support member gets behind the first or second support member and aligns a batch of a plurality of bags.

In this case, for example, the third support member that aligned a batch of a predetermined number of bags between the first support member and the third support member is moved to get ahead of the first support member and get behind the second support member. Thereby, even when there is only one third support member, the same effect as described above can be obtained.

(B) The above embodiment is described with an example in which the conveying surface formed by the plurality of base plates 41a and 42a in the conveyance mechanism 40 is disposed such that the height of the conveying surface increases in the downstream direction. However, the present invention is not limited thereto.

Figure 15:
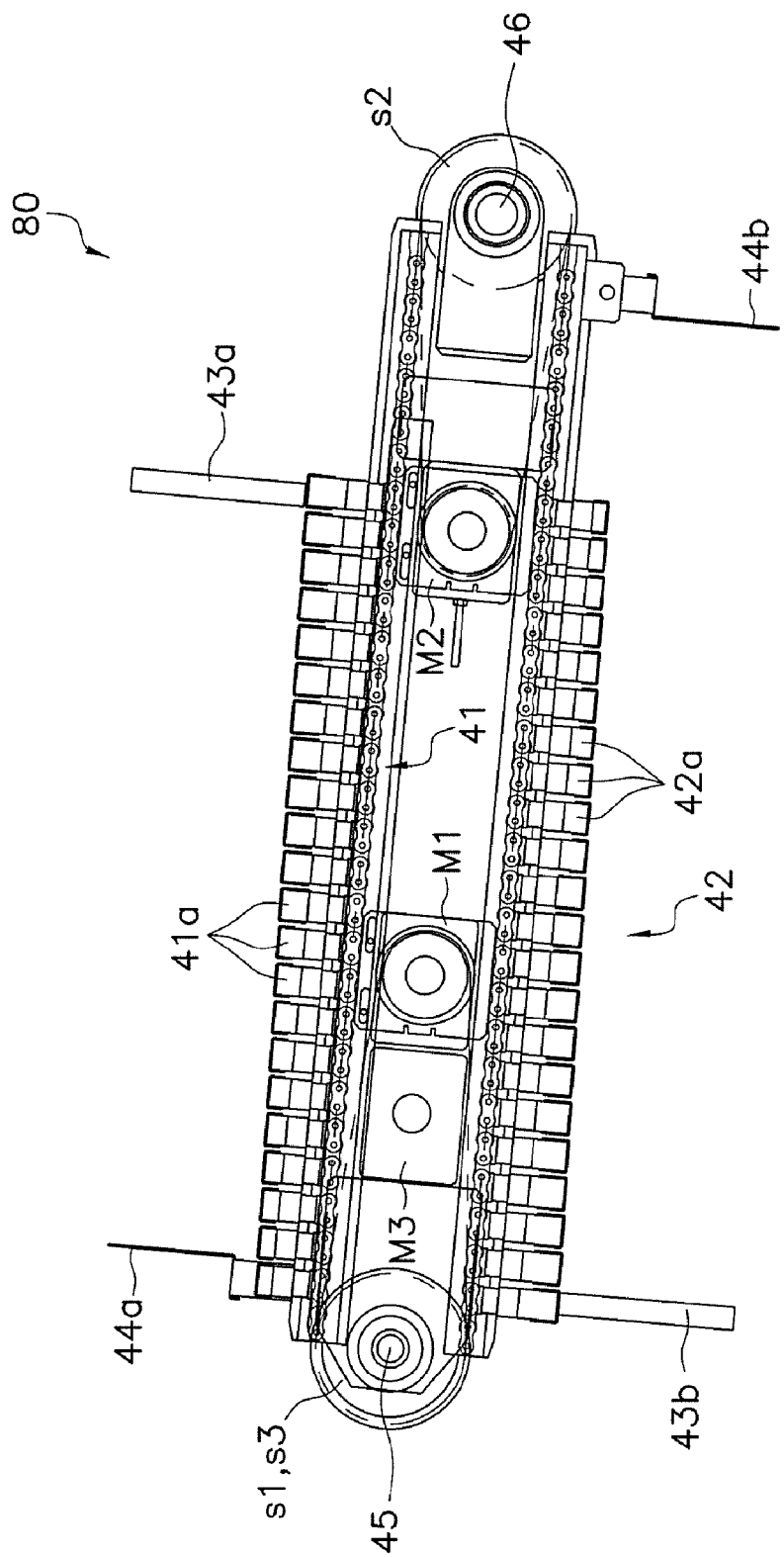
FIG. 15 is a front elevational view showing a configuration of a conveyance mechanism mounted in a packing device according to another embodiment of the present invention.

For example, as shown in FIG. 15, a conveyance mechanism 80 may be used in which the buckets 41 and 42 are disposed to be inclined such that a rotation axis 45 is located higher than a rotation axis 46.

In this case, the products X supplied from the delivery mechanism 20 are arranged to lean against the foremost partition plate 43a in order to concentrate forces applied to the products X in one direction. By so doing, a batch of the products X conveyed in a sandwiched manner between the partition plate 43a and the back plate 44a can be further stably conveyed.

Figure 16:
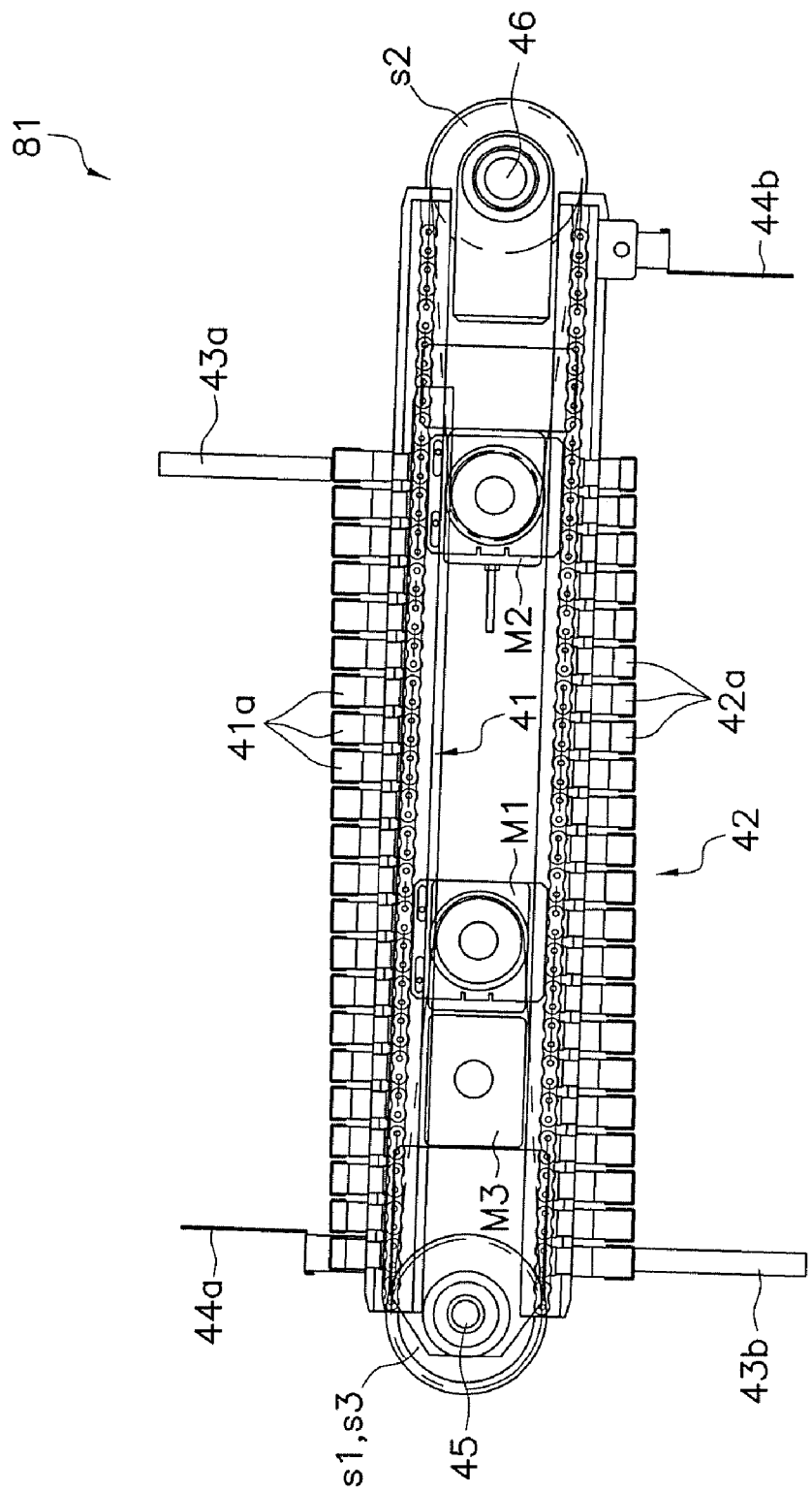
FIG. 16 is a front elevational view showing a configuration of a conveyance mechanism mounted in a packing device according to yet another embodiment of the present invention.

In addition, as shown in FIG. 16, a conveyance mechanism 81 may be used in which the conveying surfaces of the buckets 41 and 42 are disposed generally horizontally.

Also in this case, by conveying a batch of the products X in a sandwiched manner between the partition plate 43a and the back plate 44a and another batch between the partition plate 43b and the back plate 44b, these batches of the products X can be stably conveyed. Thus, the same effect as described above can be obtained.

Further, as shown in FIGS. 15 and 16, the partition plates 43a and 43b may be disposed to be inclined forward in the conveying direction, regardless of the orientation of the conveying surfaces of the buckets 41 and 42.

In this case, as in the state shown in FIG. 15, the products X supplied from the delivery mechanism 20 are arranged to lean against the foremost partition plate 43a in order to concentrate forces applied to the products X in one direction. By so doing, a batch of the products X conveyed in a sandwiched manner between the partition plate 43a and the back plate 44a can be further stably conveyed.

(C) The above embodiment is described with an example in which the batches of the products X are conveyed in a predetermined direction by the two buckets 41 and 42. However, the present invention is not limited thereto.

The number of the buckets is not limited to two. For example, the device may be configured to convey batches of the products X by a conveyance mechanism equipped with three or more buckets.

Also in this case, by providing a partition plate at the front end side of each bucket and by providing a back plate that moves at the rear side of each partition plate, batches of the products X can be stably conveyed. Thus, the same effect as described above can be obtained.

(D) The above embodiment is described with the conveyor unit 10 mounted in the packing device 1 as an example. However, the present invention is not limited thereto.

For example, the conveyor unit 10 may be provided to a different industrial machine.

Also in this case, the same effect as described above can be obtained by the conveyor unit 10 according to the above embodiment.

(E) The above embodiment is described with an example in which the conveyor unit 10 conveys the products X, which are the bags formed by a soft packaging material. However, the present invention is not limited thereto.

For example, products and the like placed in paper boxes, instead of products packaged in a soft packaging material, may be conveyed by the conveyor unit 10, when the size of such products is a size capable of being conveyed by the conveyor unit 10.

Also in this case, the same effect as described above can be obtained by the conveyor unit 10 according to the above embodiment.

(F) The above embodiment is described with an example in which, as shown in FIGS. 9(a) to 9(d), the back plates 44a and 44b as the third support members are provided, one for each of the partition plates 43a and 43b as the first and second support members, respectively. However, the present invention is not limited thereto.

For example, as shown in FIGS. 17(a) to 17(d), a single-piece back plate 144 may be provided as the third support member to the partition plates 43a and 43b as the first and second support members.

In this case, first, as shown in FIGS. 17(a) and 17(b), a batch of bags of the products X is aligned between the partition plate 43a and the back plate 144. Next, as shown in FIGS. 17(c) and 17(d), another batch of bags of the products X is aligned between the back plate 144 and the partition plate 43b.

Accordingly, the batches of bags of the products X can be securely held by the three support members from the front and back in the conveying direction, and stably conveyed in a desired direction.

(G) The above embodiment is described with an example in which, as shown in FIGS. 9(a) to 9(d), the batches of five products X are aligned between the spaces formed by the partition plates 43a and 43b as the first and second support members and the back plates 44a and 44b as the third support members and conveyed to the downstream side. However, the present invention is not limited thereto.

For example, as shown in FIGS. 18(a) to 18(d), batches of different numbers of products X such as five, three, and two bags of the products X may be held between the partition plates 43a and 43b as the first and second support members and the back plates 44a and 44b and conveyed to the downstream side.

Note that also in the configuration in which the single-piece back plate 144 described in (F) in the section of OTHER EMBODIMENTS is provided as the third support member to the partition plates 43a and 43b as the first and second support members, batches of different numbers of products X may be held in the spaces formed by each support member.

Since the conveyance device of the present invention provides an effect in which a batch of a plurality articles aligned on the conveying surface is always stably conveyed in a predetermined direction, the present invention is widely applicable to a conveyance device mounted not only on the packing device but also on other devices.

The invention claimed is:

1. A conveyance device for accumulating and aligning a plurality of articles carried in thereto and conveying a batch of the articles, the conveyance device comprising:
   a conveyance unit configured to convey the batch of the articles in a conveying direction;
   a first support member and a second support member configured to circulate along an annular path of the conveyance unit so as to support an article disposed at a front end or a back end among the articles constituting the batch of the articles;
   a third support member arranged on the conveyance unit and configured to circulate along the annular path of the conveyance unit so as to sandwich the batch of the articles between the third support member and at least one of the first support member and the second support member; and
   a drive unit configured to independently drive each of the first, second and third support members.

2. The conveyance device according to claim 1, further comprising
   an additional third support member so that the third support member is provided one for each of the first and second support members.

3. The conveyance device according to claim 2, wherein the drive unit includes a drive source configured to move both of the third support members.

4. The conveyance device according to claim 1, wherein the conveyance unit has a conveying surface for aligning the articles, the conveying surface being disposed along a generally horizontal direction.

5. The conveyance device according to claim 1, wherein the conveyance unit has a conveying surface for aligning the articles, the conveying surface being inclined downward toward a downstream end of the conveying surface with respect to the conveying direction.

6. The conveyance device according to claim 1, wherein at least one of the first support member and the second support member is configured such that a surface of the at least one of the first support member and the second support member that comes into contact with the articles is inclined toward a downstream end of the conveying surface with respect to the conveying direction of the conveyance unit.

7. A conveyance device according to claim 1, wherein the drive unit includes a plurality of drive sources configured to independently move the first, second and third support members, the drive sources being respectively coupled to a plurality of sprockets that have the same diameter.

8. The conveyance device according to claim 1, wherein the conveyance device includes no additional third support member.

9. The conveyance device according to claim 1, wherein the first, second and third support members are arranged so that different numbers of the articles are supported in a sandwiched manner between the first, second and third support members.

10. A packing device comprising:
    the conveyance device according to claim 1; and
    a push-in member configured to move the batch of the articles aligned by the conveyance device into a box.

* * * * *